(12) United States Patent
Yoshida et al.

(10) Patent No.: US 8,281,047 B2
(45) Date of Patent: Oct. 2, 2012

(54) ELECTRONIC DEVICE AND CONTROL SIGNAL SENDING METHOD IN ELECTRONIC DEVICE

(75) Inventors: Kikutada Yoshida, Tokyo (JP); Tatsuya Sato, Kanagawa (JP)

(73) Assignee: Sony Corporation (JP)

( * ) Notice: Subject to any disclaimer, the term of this patent is extended or adjusted under 35 U.S.C. 154(b) by 180 days.

(21) Appl. No.: 12/451,452

(22) PCT Filed: Mar. 30, 2009

(86) PCT No.: PCT/JP2009/056492
§ 371 (c)(1),
(2), (4) Date: Nov. 12, 2009

(87) PCT Pub. No.: WO2009/123110
PCT Pub. Date: Oct. 8, 2009

(65) Prior Publication Data
US 2010/0157169 A1  Jun. 24, 2010

(30) Foreign Application Priority Data
Apr. 4, 2008 (JP) ................. P2008-098703

(51) Int. Cl.
*G06F 13/10* (2006.01)
(52) U.S. Cl. ............... 710/9; 710/2; 710/3; 710/62
(58) Field of Classification Search .............. None
See application file for complete search history.

(56) References Cited

U.S. PATENT DOCUMENTS

| 7,394,499 B2 | 7/2008 | Okamoto et al. | |
|---|---|---|---|
| 2006/0095596 A1* | 5/2006 | Yung et al. | 710/5 |
| 2008/0297371 A1* | 12/2008 | Ida | 340/825.52 |
| 2009/0022176 A1* | 1/2009 | Nguyen | 370/466 |
| 2009/0237561 A1 | 9/2009 | Kobayashi | |
| 2009/0260043 A1 | 10/2009 | Tatsuta et al. | |

FOREIGN PATENT DOCUMENTS

| JP | 2000-152155 A | 5/2000 |
|---|---|---|
| JP | 2006-270780 A | 10/2006 |
| JP | 2008-048137 A | 2/2008 |
| JP | 2009-027599 A | 2/2009 |
| JP | 2009-111738 A | 5/2009 |
| WO | WO-02-078336 A1 | 10/2002 |
| WO | WO-2007-037379 A1 | 4/2007 |
| WO | WO-2007-049556 A1 | 5/2007 |

* cited by examiner

*Primary Examiner* — Ilwoo Park
(74) *Attorney, Agent, or Firm* — Lerner, David, Littenberg, Krumholz & Mentlik, LLP

(57) ABSTRACT

[Object] To make it possible to control a CEC-non-compliant device connected to a television receiver by using a remote control sender of the television receiver.

[Solving Means] The fact that a physical address [2000] is a device (Recording Device) that a photo player 370B controls in place of the physical address [2000] is set by a user in the photo player 370B. In accordance with this setting, the photo player 370B decides a logical address {1} as a CEC-controlled Recording Device. When the user operates a disc recorder 210B that is a CEC-non-compliant device by using a remote control sender 277, a television receiver 250B generates a CEC control command addressed to the disc recorder 210B. The photo player 370B detects the CEC control command, converts the CEC control command into an infrared remote control command, and sends the infrared remote control command from an infrared sending unit 384 to the disc recorder 210B.

11 Claims, 31 Drawing Sheets

FIG. 8

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power |

FIG. 16
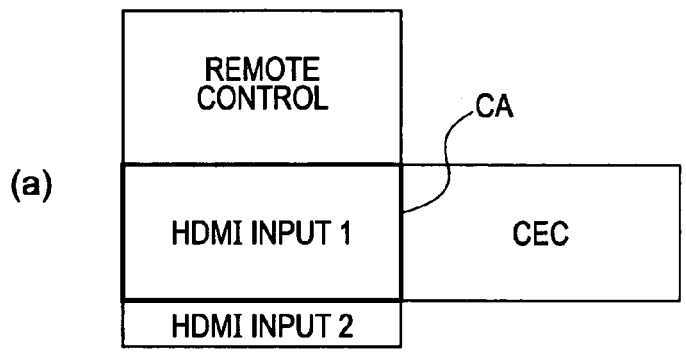
(a)
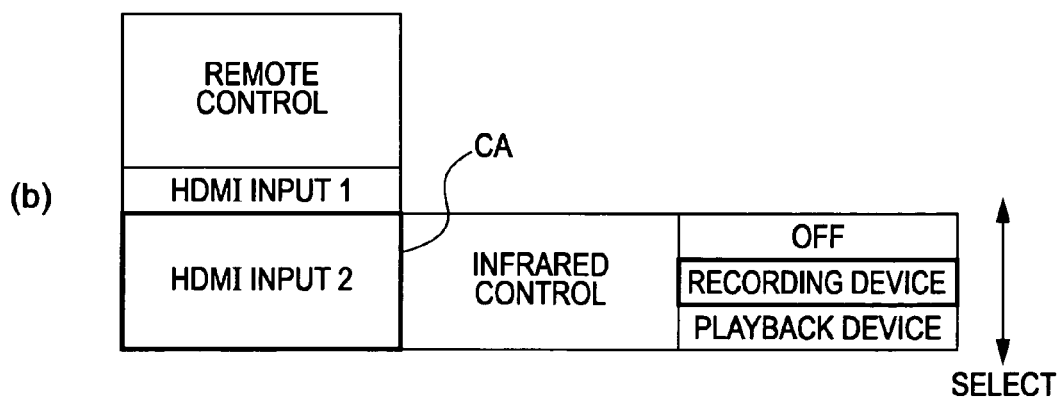
(b)

FIG. 20

INPUT 2: IR CONTROL

OFF | RECORDING DEVICE | PLAYBACK DEVICE

FIG. 26

0 TV
1 Recording Device 1
2 Recording Device 2
3 Tuner 1
4 Playback Device 1
5 Audio System
6 Tuner 2
7 Tuner 3
8 Playback Device 2
9 Recording Device 3
10 Tuner 4
11 Playback Device 3
12 Reserved
13 Reserved
14 Free Use
15 Unregistered

US 8,281,047 B2

ELECTRONIC DEVICE AND CONTROL SIGNAL SENDING METHOD IN ELECTRONIC DEVICE

CROSS-REFERENCES TO RELATED APPLICATIONS

The present application is a national phase entry under 35 U.S.C. §371 of International Application No. PCT/JP2009/056492 filed Mar. 30, 2009, published on Oct. 8, 2009 as WO 2009/123110 A1, which claims priority from Japanese Patent Application No. JP 2008-098703 filed in the Japanese Patent Office on Apr. 4, 2008.

TECHNICAL FIELD

The present invention relates to an electronic device and a control signal sending method in the electronic device. More particularly, the present invention relates to an electronic device or the like that, in the case where a control signal in a first format is a control signal for a controlled device, makes it possible to control the controlled device that only handles a control signal in a second format, on the basis of the control signal in the first format by converting the control signal in the first format into the control signal in the second format and sending the control signal in the second format to the controlled device.

BACKGROUND ART

Recently, the HDMI (High Definition Multimedia Interface) has been spread widely as a communication interface that transmits a digital video signal and a digital audio signal that accompanies the video signal at a high speed from, for example, a DVD (Digital Versatile Disc) recorder, a set top box, or another AV source (Audio Visual source) to a television receiver, a projector, or another display. For example, Patent Document 1 includes a detailed description of the HDMI standard.

Also, recently, adoption of CEC (Consumer Electronics Control) that can control an electronic device connected to a television receiver by using a remote control sender of the television receiver has been actively done. This is a scheme that adds a CEC control signal line to an HDMI signal.

FIG. 24 illustrates a structure example of a known AV system 200. The AV (Audio Visual) system 200 includes a disc recorder 210 serving as a source device, a photo player 370 serving as a source device, and a television receiver 250 serving as a sink device.

The photo player 370 and the television receiver 250 are connected to each other via an HDMI cable 391. That is, one of two ends of the HDMI cable 391 is connected to an HDMI terminal 371 of the photo player 370, and the other end is connected to an HDMI terminal 251 of the television receiver 250.

The disc recorder 210 and the television receiver 250 are connected to each other via an HDMI cable 392. That is, one of two ends of the HDMI cable 392 is connected to an HDMI terminal 211 of the disc recorder 210, and the other end is connected to an HDMI terminal 254 of the television receiver 250.

The television receiver 250 is a CEC-compliant device and includes an infrared receiving unit (IR receiving unit) 276 that receives an infrared remote control signal from a remote control sender 277. Also, the disc recorder 210 and the photo player 370 are CEC-compliant devices.

In the AV system 200 illustrated in FIG. 24, both the disc recorder 210 and the photo player 370 are CEC-compliant devices. Therefore, the operation of the disc recorder 210 and the photo player 370 can be controlled using the remote control sender 277 of the television receiver 250.

FIG. 25 illustrates an example of an operation sequence at the time the photo player 370 and the disc recorder 210 are connected to the television receiver 250.

(a) When the photo player 370 is connected to the television receiver 250 via the HDMI cable 391, (b) the photo player 370 obtains a Physical Address [1000] from the television receiver 250 by using an HDMI control protocol.

A CEC-compliant device is defined to obtain a Logical Address at the time of an HDMI connection. Using the logical address, the CEC-compliant device sends/receives a message. FIG. 26 illustrates a CEC table that illustrates the corresponding relationship between a device and a CEC logical address.

A device called "TV" is a television, a projector, or the like. A device called "Recording Device" is an HDD recorder or the like. A device called "Tuner" is an STB (Set Top Box) or the like. A device called "Playback Device" is a DVD player, a camcorder, or the like. A device called "Audio System" is an AV amplifier or the like.

As is clear from the table of FIG. 26, the number of individual devices that can be connected at a time is defined. When devices greater than or equal to the defined number are connected, logical addresses of these devices will be {15}.

Referring back to FIG. 25, (c) since the photo player 370 itself is a playback device, the photo player 370 decides the logical address {4} as a CEC-controlled Playback Device on the basis of the table of FIG. 26. In this case, after the photo player 370 recognizes that there is no other device that has the logical address {4} by performing Polling Message using the CEC control protocol, the photo player 370 decides the logical address {4} as its logical address.

(d) After the photo player 370 decides the logical address {4} as described above, the photo player 370 notifies the television receiver 250 of the fact that the physical address [1000] is a CEC-compliant device {4} by performing Report Physical Address using the CEC control protocol.

(e) When the disc recorder 210 is connected to the television receiver 250 via the HDMI cable 392, (f) the disc recorder 210 obtains a Physical Address [2000] from the television receiver 250 by using the HDMI control protocol.

(g) Since the disc recorder 210 itself is a recording device, the disc recorder 210 decides the logical address {1} as a CEC-controlled Recording Device on the basis of the table of FIG. 26. In this case, after the disc recorder 210 recognizes that there is no other device that has the logical address {1} by performing Polling Message using the CEC control protocol, the disc recorder 210 decides the logical address {1} as its logical address.

(h) After the disc recorder 210 decides the logical address {1} as described above, the disc recorder 210 notifies the television receiver 250 of the fact that the physical address [2000] is a CEC-compliant device {1} by performing Report Physical Address using the CEC control protocol.

FIG. 27 illustrates an example of an operation sequence at the time playback control of the photo player 370 and the disc recorder 210 is performed by using the remote control sender 277 of the television receiver 250.

(a) When a user switches the input to the photo player 370 by using the remote control sender 277 of the television receiver 250, (b) the television receiver 250 notifies a connected CEC-compliant device(s) of the fact that the input has been switched from the television receiver 250 to the photo player 370 by performing SetStreamPath[0000]→[1000] using the CEC control protocol.

(c) The photo player 370 with the logical address [1000] detects this notification and notifies the connected CEC-compliant device(s) of the fact that the device under control of CEC has been switched to the photo player 370 by performing ActiveSource{4}→{F}. (d) Accordingly, the television receiver 250 switches a remote control sending destination to the photo player 370.

(e) When the user presses a playback key on the remote control sender 277 of the television receiver 250, (f) the television receiver 250 notifies the connected CEC-compliant device(s) of UserControlPressed:PB{4} using the CEC control protocol. (g) The photo player 370 with the logical address {4} detects this notification, plays an image in a flash memory, and sends the playback output to the television receiver 250 via the HDMI cable 391.

Next, (h) when the user switches the input to the disc recorder 210 by using the remote control sender 277 of the television receiver 250, (i) the television receiver 250 notifies the connected CEC-compliant device(s) of the fact that the input has been switched from the photo player 370 to the disc recorder 210 by performing SetStreamPath[1000]→[2000] using the CEC control protocol.

(j) The disc recorder 210 with the logical address [2000] detects this notification and notifies the connected CEC-compliant device(s) of the fact that the device under control of CEC has been switched to the disc recorder 210 by performing ActiveSource{1}→{F}. (k) Accordingly, the television receiver 250 switches the remote control sending destination to the disc recorder 210.

(m) When the user presses the playback key on the remote control sender 277 of the television receiver 250, (n) the television receiver 250 notifies the connected CEC-compliant device(s) of UserControlPressed:PB{1} using the CEC control protocol. (p) The disc recorder 210 with the logical address {1} detects this notification, plays an image recorded on a disc, and sends the playback output to the television receiver 250 via the HDMI cable 392.

FIG. 28 illustrates a structure example of the photo player 370. The photo player 370 includes the HDMI terminal 371, an HDMI sending unit 372, a CPU (Central Processing Unit) 374, a ROM (Read Only Memory) 375, a RAM (Random Access Memory) 376, a bus 377, an external memory interface 378, and a signal processing LSI 379.

In the photo player 370, the CPU 374, the ROM 375, and the RAM 376 are interconnected by the bus 377. The CPU 374 controls the operation of each unit of the photo player 370. The ROM 375 stores an operating program of the CPU 374 and the like. The RAM 375 is used as a work area for the CPU 374 or the like. The CPU 374 executes a control operation by reading the operating program from the ROM and expanding the operating program on the RAM.

Furthermore, the external memory interface 378 and the signal processing LSI 379 are connected to the bus 377. The external memory interface 378 includes a loading unit for a flash memory 380. Under control of the CPU 374, the external memory interface 378 reads still image data from the loaded flash memory 380. For example, the external memory interface 378 is a memory card drive, and the flash memory 380 is a memory card.

As described above, still image data read from the flash memory 380 is compressed and encoded data such as JPEG data. The signal processing LSI 379 applies expansion processing to the still image data read from the flash memory 380 and obtains a baseband video signal (image data). The HDMI sending unit 372 sends the baseband video signal, which is obtained by the signal processing LSI, from the HDMI terminal 371 by performing HDMI-based communication.

In the photo player 370 illustrated in FIG. 28, a CEC control command supplied from the television receiver 250 via a CEC line of the HDMI cable 391 is, as indicated by broken lines in FIG. 29, supplied from the HDMI sending unit 372 via the CPU 374 to the RAM 376, and temporarily held in the RAM 376. The CPU 374 reads and analyzes the CEC control command held in the RAM 376.

When the CEC control command is a playback command, reading of still image data from the loaded flash memory 380 is performed using the external memory interface 378 under control of the CPU 374. The still image data read from the flash memory 380 is, as indicated by a broken line in FIG. 30, supplied from the external memory interface 378 via the bus 377 to the RAM 376, and temporarily held in the RAM 376.

Thereafter, the still image data held in the RAM 376 is, as indicated by a broken line in FIG. 30, read from the RAM 376 and supplied to the signal processing LSI 379. The signal processing LSI 379 applies expansion processing to the still image data supplied from the RAM 376 and obtains a baseband video signal (image data). The baseband video signal is supplied to the HDMI sending unit 372, and sent to the HDMI cable 391 connected to the HDMI terminal 371.

As described above, since both the disc recorder 210 and the photo player 370 in the AV system 200 illustrated in FIG. 24 are CEC-compliant devices, the operation of the disc recorder 210 and the photo player 370 can be controlled using the remote control sender 277 of the television receiver 250.

In contrast, an AV system 200A illustrated in FIG. 31 is also conceivable. In FIG. 31, portions corresponding to FIG. 24 are given the same reference numerals. In the AV system 200A, instead of the disc recorder 210 in the AV system 200 illustrated in FIG. 24, a disc recorder 210A is connected via the HDMI cable 392 to the television receiver 250.

The disc recorder 210A is a CEC-non-compliant device. Therefore, when the disc recorder 210A is connected to the television receiver 250 via the HDMI cable 392, the disc recorder 210A obtains a Physical Address [2000] from the television receiver 250 using the HDMI control protocol, but does not obtain a CEC logical address.

Since the photo player 370 is a CEC-compliant device in the AV system 200A, the operation of the photo player 370 can be controlled using the remote control sender 277 of the television receiver 250. However, since the disc recorder 210A is a CEC-non-compliant device, the operation of the disc recorder 210A cannot be controlled using the remote control sender 277 of the television receiver 250.

Therefore, the operation of the disc recorder 210A in the AV system 200A is performed using a remote control sender 232 of the disc recorder 210A by using an infrared receiving unit 231 included in the disc recorder 210A.

Patent Document 1: Publication No. WO2002/078336

DISCLOSURE OF INVENTION

Technical Problem

As in the AV system 200A of FIG. 31 described above, no operation control using the remote control sender 277 of the television receiver 250 can be performed on a CEC-non-compliant device among devices connected to the television receiver 250 via HDMI cables. However, if operation control using the remote control sender 277 of the television receiver 250 can be performed on the CEC-non-compliant device, this is convenient.

It is an object of the present invention to make it possible to control, for example, a CEC-non-compliant device connected to a television receiver by using a remote control sender of the television receiver.

Technical Solution

A concept of the present invention resides in an electronic device including:

an information setting unit that sets information of a controlled device;

a control signal converting unit that converts, when a control signal in a first format is a control signal for the controlled device for which the information has been set by the information setting unit, the control signal into a control signal in a second format; and a control signal sending unit that sends the control signal in the second format, which is converted by the control signal converting unit, to the controlled device.

In the present invention, information of the controlled device is set by the information setting unit. For example, when the control signal in the first format is a CEC signal, at least a physical address and a device category of the controlled device are set as information of the controlled device. Since the physical address and the device category of the controlled device are set as described above, in place of the controlled device, a CEC logical address can be virtually decided.

When the control signal in the first format is a control signal for the above-described controlled device, the control signal is converted by the control signal converting unit into the control signal in the second format. For example, when the control signal in the first format is a CEC signal, if a CEC logical address indicating a destination of the CEC signal matches the above-described virtually decided CEC logical address, it is determined that the CEC signal is a control signal for the controlled device.

The control signal in the first format is received by, for example, a control signal receiving unit from an external device. For example, in the external device, the control signal in the first format is generated by a control signal generating unit based on a remote control signal received by a remote control receiving unit.

In a device that includes a video signal sending unit that sends a video signal as a differential signal to an external device by using a plurality of channels via a transmission path, the control signal receiving unit may receive the control signal in the first format from the external device via a control data line constituting the transmission path. For example, the control signal in the first format is a CEC signal, and the control signal in the second format is an infrared signal.

Also, for example, the control signal in the first format is generated by the control signal generating unit based on the remote control signal received by the remote control receiving unit.

The control signal in the first format, which is obtained by the control signal converting unit, is sent by the control signal sending unit to the controlled device. The control signal in the second format is sent as, for example, an infrared signal to the controlled device via a cable or wirelessly.

Also, for example, as described above, in a device that includes a video signal sending unit that sends a video signal as a differential signal to an external device by using a plurality of channels via a transmission path, the control signal sending unit may send the control signal in the second format via a bidirectional communication channel constituted by predetermined lines of the transmission path. The predetermined lines are, for example, a reserved line and an HPD line constituting an HDMI cable.

Also, for example, in a device that includes a video signal receiving unit that receives, from the controlled device, a video signal as a differential signal by using a plurality of channels via a transmission path, the control signal sending unit may send the control signal in the second format to the controlled device via a bidirectional communication channel constituted by predetermined lines of the transmission path.

In the present invention, as described above, when the control signal in the first format is a control signal for the controlled device, the control signal in the first format is converted into the control signal in the second format, and the control signal in the second format is sent to the controlled device. Operation control of the controlled device which only handles the control signal in the second format can be performed on the basis of the control signal in the first format.

Also, a concept of the present invention resides in an electronic device including:

an address information receiving unit that receives, from a first external device that handles a control signal in a first format, address information of a second external device that handles a control signal in a second format;

a remote control receiving unit that receives a remote control signal;

a control signal generating unit that generates the control signal in the first format for the second external device based on the remote control signal received by the remote control receiving unit and the address information of the second external device, which is received by the address information receiving unit; and a control signal sending unit that sends the control signal in the first format, which is generated by the control signal generating unit, to the first external device.

In the present invention, from a first external device that handles a control signal in a first format, address information of a second external device that handles a control signal in a second format is received by an address information receiving unit. Based on a remote control signal received by a remote control receiving unit and the above-described address information of the second external device, the control signal in the first format for the second external device is generated by a control signal generating unit. The control signal in the first format is sent to the first external device.

In a device that includes a video signal receiving unit that receives, from the first external device, a video signal as a differential signal by using a plurality of channels via a transmission path, the control signal sending unit may send the control signal in the first format to the first external device via a control data line constituting the transmission path. For example, the control signal in the first format is a CEC signal, and, as described above, the address information of the second external device, which is received by the address information receiving unit, is a virtual logical address of the second external device, which is set in the first external device.

In the first external device, when the received control signal in the first format is for the second external device, the signal in the first format is converted into the control signal in the second format, and the control signal in the second format is sent to the second external device. Therefore, in the present invention, the control signal in the first format is sent to the first external device, and, through the first external device, operation control of the second external device which only handles the control signal in the second format can be performed.

Advantageous Effects

According to the present invention, operation control of a controlled device that only handles a control signal in a second format can be performed on the basis of a control signal in a first format. For example, the operation of a CEC-non-compliant device connected to a television receiver that is a CEC-compliant device can be controlled using a remote control sender of the television receiver.

BRIEF DESCRIPTION OF DRAWINGS

FIG. 8 is a diagram illustrating a pin arrangement (type A) of an HDMI terminal.

FIG. 16 includes diagrams illustrating display examples at the time a user setting of the remote control of the television receiver is performed.

FIG. 20 is a diagram illustrating a display example at the time a user setting of the AV amplifier is performed.

FIG. 26 is a diagram illustrating a CEC table that illustrates the corresponding relationship between a device and a CEC logical address.

Figure 1:
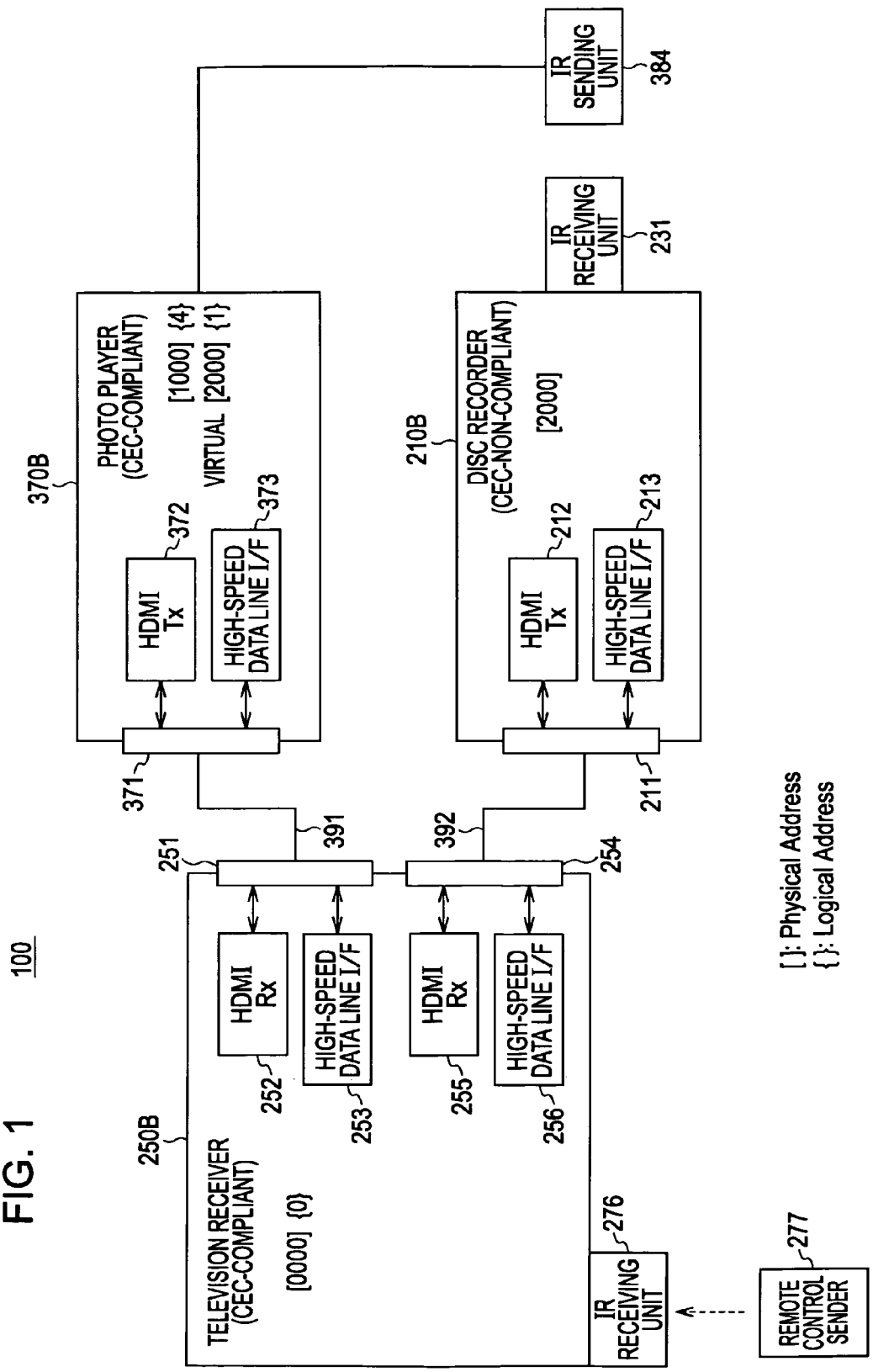
FIG. 1 is a block diagram illustrating a structure example of an AV system serving as an embodiment of the present invention.

EXPLANATION OF REFERENCE NUMERALS 100, 100', 100": AV system, 210B: disc recorder, 211: HDMI terminal, 212: HDMI sending unit, 213: high-speed data line interface, 231: infrared receiving unit, 250B, 250B': television receiver, 251, 254: HDMI terminal, 252, 255: HDMI receiving unit, 253, 256: high-speed data line interface, 276: infrared receiving unit, 277: remote control sender, 278: infrared sending unit, 310: AV amplifier, 311A, 311B, 314: HDMI terminal, 330: infrared sending unit, 370B, 370B': photo player, 371: HDMI terminal, 372: HDMI sending unit, 373: high-speed data line interface, 384: infrared sending unit, 391, 392, 393: HDMI cable

BEST MODES FOR CARRYING OUT THE INVENTION

Hereinafter, with reference to the drawings, embodiments of the present invention will be described. FIG. 1 illustrates a structure example of an AV system 100 serving as an embodiment.

The AV system 100 includes a television receiver 250B, a photo player 370B, and a disc recorder 210B. The photo player 370B and the disc recorder 210B constitute HDMI source devices. The television receiver 250B constitutes an HDMI sink device.

The photo player 370B and the television receiver 250B are connected to each other via an HDMI cable 391. In the photo player 370B, an HDMI terminal 371 to which an HDMI sending unit (HDMI TX) 372 and a high-speed data line interface 373 are connected is provided. In the television receiver 250B, an HDMI terminal 251 to which an HDMI receiving unit (HDMI RX) 252 and a high-speed data line interface 253 are connected is provided. One of two ends of the HDMI cable 391 is connected to the HDMI terminal 371 of the photo player 370B, and the other end of the HDMI cable 391 is connected to the HDMI terminal 251 of the television receiver 250B.

Also, the disc recorder 210B and the television receiver 250B are connected to each other via an HDMI cable 392. In the disc recorder 210B, an HDMI terminal 211 to which an HDMI sending unit (HDMI TX) 212 and a high-speed data line interface 213 are connected is provided. In the television receiver 250B, an HDMI terminal 254 to which an HDMI receiving unit (HDMI RX) 255 and a high-speed data line interface 256 are connected is provided. One of two ends of the HDMI cable 392 is connected to the HDMI terminal 211 of the disc recorder 210B, and the other end of the HDMI cable 392 is connected to the HDMI terminal 254 of the television receiver 250B.

The television receiver 250B is a CEC-compliant device and includes an infrared receiving unit (IR receiving unit) 276 that receives an infrared remote control signal from a remote control sender 277. Also, the photo player 370B is a CEC-compliant device and includes an infrared sending unit 384 that sends an infrared signal. Also, the disc recorder 210B is a CEC-non-compliant device and includes an infrared receiving unit 231 that receives an infrared signal.

In the AV system 100 illustrated in FIG. 1, a video signal (image data) played by the photo player 370B is supplied via the HDMI cable 391 to the television receiver 250B, and a playback image is displayed on the television receiver 250B. Also, in the AV system 100 illustrated in FIG. 1, a video signal (image data) played by the disc recorder 210B is supplied via the HDMI cable 392 to the television receiver 250B, and a playback image is displayed on the television receiver 250B.

Figure 2:
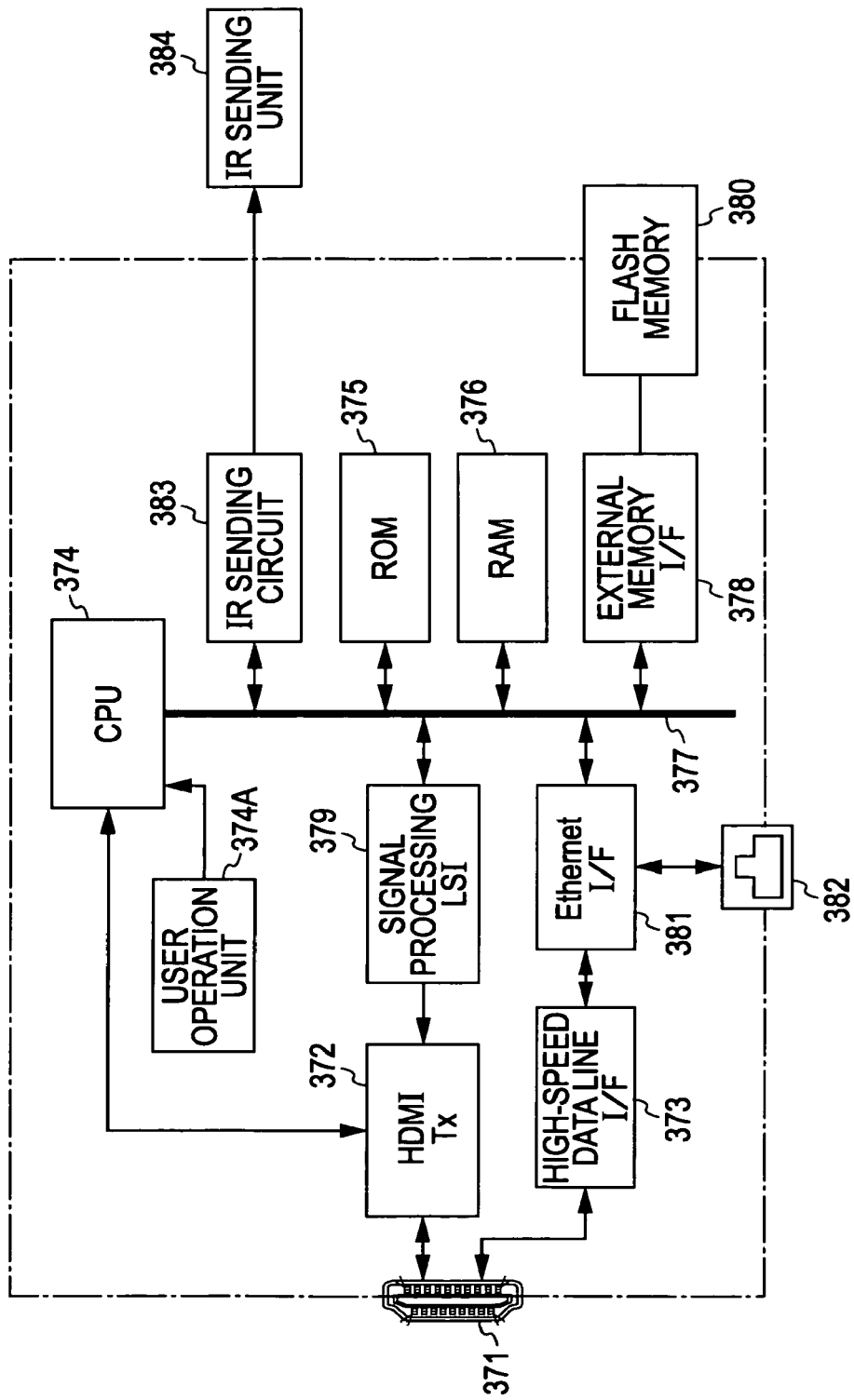
FIG. 2 is a block diagram illustrating a structure example of a photo player (source device) constituting the AV system.

FIG. 2 illustrates a structure example of the photo player 370B. The photo player 370B includes the HDMI terminal 371, the HDMI sending unit 372, the high-speed data line interface 373, a CPU (Central Processing Unit) 374, a ROM (Read Only Memory) 375, a RAM (Random Access Memory) 376, a bus 377, an external interface 378, a signal processing LSI 379, an Ethernet interface (Ethernet I/F) 381, a network terminal 382, an infrared sending circuit 383, and an infrared sending unit 384. Note that "Ethernet" is a registered trademark.

In the photo player 370B, the CPU 374, the ROM 375, and the RAM 376 are interconnected by the bus 377. The CPU 374 controls the operation of each unit of the photo player 370B. The ROM 375 stores an operating program of the CPU 374 and the like. The RAM 376 is used as a work area for the CPU 374 or the like. The CPU 374 executes a control operation by reading the operating program from the ROM and expanding the operating program on the RAM.

Furthermore, the external memory interface 378, the signal processing LSI 379, the Ethernet interface 381, and the infrared sending circuit 383 are connected to the bus 377. The external memory interface 378 includes a loading unit for a flash memory 380. Under control of the CPU 374, the external memory interface 378 reads still image data from the loaded flash memory 380. For example, the external memory interface 378 is a memory card drive, and the flash memory 380 is a memory card.

As described above, still image data read from the flash memory 380 is compressed and encoded data such as JPEG data. The signal processing LSI 379 applies expansion processing to the still image data read from the flash memory 380 and obtains a baseband video signal (image data).

Under control of the CPU 374, the infrared sending circuit 383 drives the infrared sending unit 384 and generates an infrared signal. The infrared sending unit 384 is constituted by, for example, an infrared light-emitting device.

The HDMI sending unit (HDMI source) 372 sends the baseband video signal (image data) from the HDMI terminal 371 by performing HDMI-based communication. The HDMI sending unit 372 will be described in detail later. The high-speed data line interface 373 is a bidirectional communication interface that uses predetermined lines (a reserved line and an HPD line in this embodiment) constituting an HDMI cable. The high-speed data line interface 373 will be described in detail later.

The high-speed data line interface 373 is connected via the Ethernet interface 381 to the bus 377. Also, the network terminal 382 is connected to the Ethernet interface 381.

The operation of the photo player 370B illustrated in FIG. 2 will be briefly described. At the time of playback of still image data written in the flash memory 380, the following operation will be performed. That is, the external memory interface 378 performs reading of still image data from the loaded flash memory 380. The still image data read from the flash memory 380 is supplied from the external memory interface 378 via the bus 377 to the RAM 376, and is temporarily held in the RAM 376.

Thereafter, the still image data held in the RAM 376 is read from the RAM 376 and supplied to the signal processing LSI 379. The signal processing LSI 379 applies expansion processing to the still image data supplied from the RAM 376, and a baseband video signal (image data) is obtained. The baseband video signal is supplied to the HDMI sending unit 372 and sent to the HDMI terminal 371.

At the time of sending still image data held in the RAM 376 to a network, the following operation will be performed. That is, the external memory interface 378 performs reading of still image data from the loaded flash memory 380. The still image data read from the flash memory 380 is supplied from the external memory interface 378 via the bus 377 to the RAM 376, and is temporarily held in the RAM 376.

Thereafter, the still image data held in the RAM 376 is read from the RAM 376, made into an IP packet, and output via the Ethernet interface 381 to the network terminal 382 or through the Ethernet interface 381 and the high-speed data line interface 373 to the HDMI terminal 371.

Figure 3:
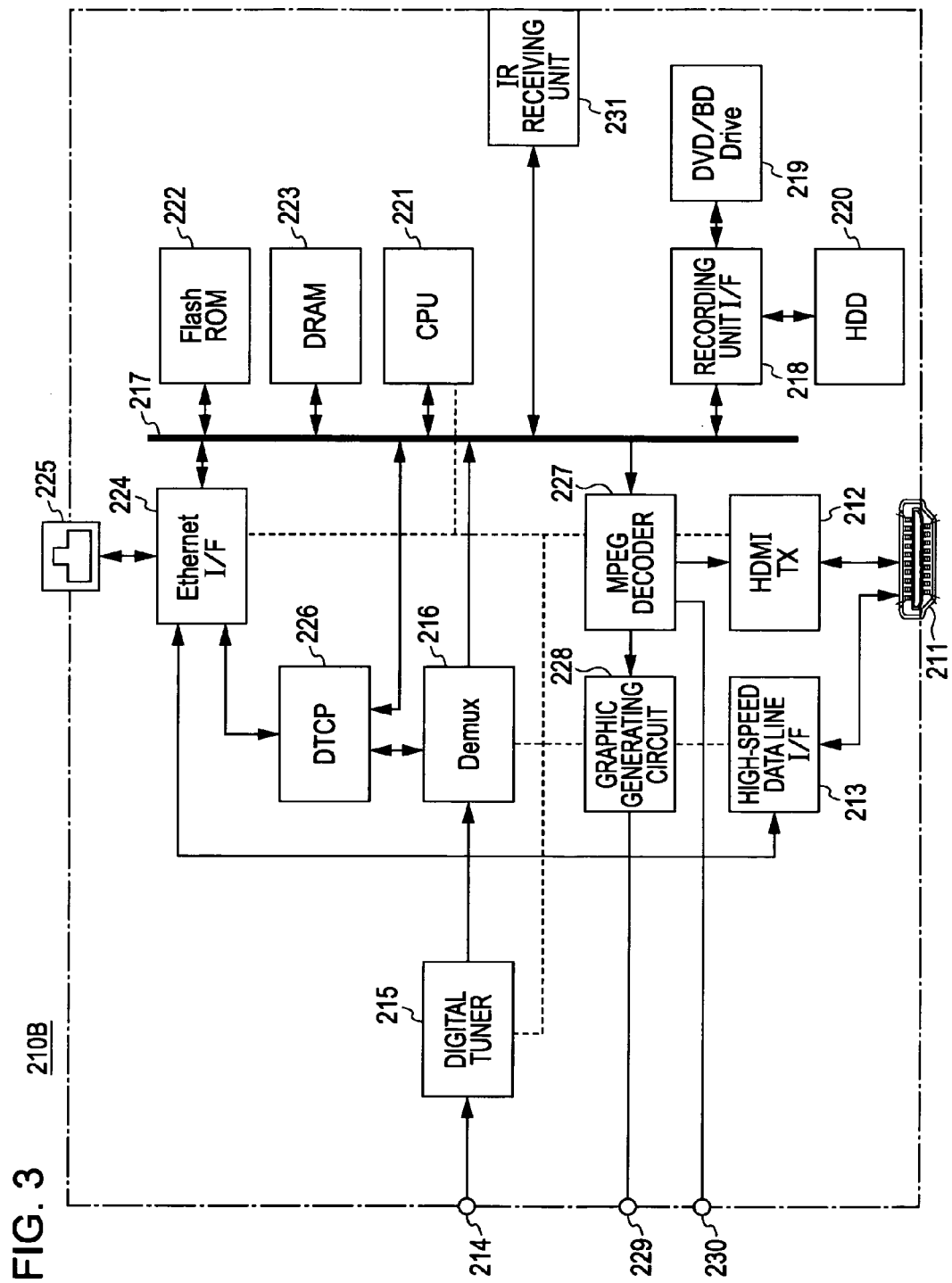
FIG. 3 is a block diagram illustrating a structure example of a disc recorder (source device) constituting the AV system.

FIG. 3 illustrates a structure example of the disc recorder 210B. The disc recorder 210B includes the HDMI terminal 211, the HDMI sending unit 212, the high-speed data line interface 213, an antenna terminal 214, a digital tuner 215, a demultiplexer 216, an internal bus 217, a recording unit interface 218, a DVD/BD drive 219, an HDD (Hard Disk Drive) 220, a CPU (Central Processing Unit) 221, a flash ROM (Read Only Memory) 222, a DRAM (Dynamic Random Access Memory) 223, an Ethernet interface (Ethernet I/F) 224, a network terminal 225, a DTCP (Digital Transmission Content Protection) circuit 226, an MPEG decoder 227, a graphic generating circuit 228, a video output terminal 229, an audio output terminal 230, and the infrared receiving unit 231.

The HDMI sending unit (HDMI source) 212 sends baseband video and audio data from the HDMI terminal 211 by performing HDMI-based communication. The HDMI sending unit 212 will be described in detail later. The high-speed data line interface 213 is a bidirectional communication interface that uses predetermined lines (a reserved line and an HPD line in this embodiment) constituting an HDMI cable. The high-speed data line interface 213 will be described in detail later.

The antenna terminal 214 is a terminal to which a television broadcast signal received at a receiving antenna (not illustrated) is input. The digital tuner 215 processes the television broadcast signal input to the antenna terminal 214 and outputs a predetermined transport stream. The demultiplexer 216 extracts, from the transport stream obtained by the digital tuner 215, a partial TS (Transport Stream) (TS packet of video data and TS packet of audio data) in accordance with a predetermined selected channel.

Also, the demultiplexer 216 extracts, from the transport stream obtained by the digital tuner 215, PSI/SI (Program Specific Information/Service Information) and outputs the PSI/SI to the CPU 221. Multiple channels are multiplexed in the transport stream obtained by the digital tuner 215. The process of extracting a partial TS of an arbitrary channel from the transport stream by using the demultiplexer 216 is made possible by obtaining information of a packet ID (PID) of the arbitrary channel from the PSI/SI (PAT/PMT).

The CPU 221, the flash ROM 222, the DRAM 223, the demultiplexer 216, the Ethernet interface 224, and the recording unit interface 218 are connected to the internal bus 217. The DVD/BD drive 219 and the HDD 220 are connected via the recording unit interface 218 to the internal bus 217. The DVD/BD drive 219 and the HDD 220 record a partial TS extracted by the demultiplexer 216. Also, the DVD/BD drive 219 and the HDD 220 each play a partial TS recorded on a recording medium.

The MPEG decoder 227 performs decoding processing of a video PES packet constituting a partial TS extracted by the demultiplexer 216 or played by the DVD/BD drive 219 or the HDD 220 and obtains video data. Also, the MPEG decoder 227 performs decoding processing of an audio PES packet constituting the partial TS and obtains audio data.

The graphic generating circuit 228 performs, as needed, superimposing processing of graphics data to video data obtained by the MPEG decoder 227. The video output terminal 229 outputs video data output from the graphic generating circuit 228. The audio output terminal 230 outputs audio data obtained by the MPEG decoder 227.

The DTCP circuit 226 encrypts, as needed, a partial TS extracted by the demultiplexer 216 or a partial TS played by the DVD/BD drive 219 or the HDD 220. Also, the DTCP circuit 226 decrypts encrypted data supplied from the network terminal 225 or the high-speed data line interface 213 to the Ethernet interface 224.

The CPU 221 controls the operation of each unit of the disc recorder 210B. The flash ROM 222 stores control software and archives data. The DRAM 223 constitutes a work area for the CPU 221. The CPU 221 expands software and data read from the flash ROM 222 on the DRAM 223, activates the software, and controls each unit of the disc recorder 210B.

As will be described later, the infrared receiving unit 231 receives an infrared signal sent from the infrared sending unit 384 of the photo player 370.

The operation of the disc recorder 210B illustrated in FIG. 3 will be briefly described.

A television broadcast signal input to the antenna terminal 214 is supplied to the digital tuner 215. In the digital tuner 215, the television broadcast signal is processed to extract a predetermined transport stream, and the predetermined transport stream is supplied to the demultiplexer 216. In the demultiplexer 216, a partial TS (TS packet of video data and TS packet of audio data) in accordance with a predetermined channel is extracted from the transport stream. The partial TS is supplied via the recording unit interface 218 to the DVD/BD drive 219 or the HDD 220, and is recorded on the basis of a recording instruction from the CPU 221.

Also, as described above, a partial TS extracted by the demultiplexer 216 or a partial TS played by the DVD/BD drive 219 or the HDD 220 is supplied to the MPEG decoder 227. In the MPEG decoder 227, decoding processing of a video PES packet constituted by the TS packet of video data is performed to obtain video data. For example, after superimposing processing of graphics data to the video data is performed by using the graphic generating circuit 228, the video data is output to the video output terminal 229. Also, in the MPEG decoder 227, decoding processing of an audio PES packet constituted by the TS packet of audio data is performed to obtain audio data. The audio data is output to the audio output terminal 230.

Video (image) data and audio data obtained by the MPEG decoder 227 in accordance with a partial TS played by the DVD/BD drive 219 or the HDD 220 is supplied to the HDMI sending unit 212, and is sent to an HDMI cable connected to the HDMI terminal 211.

Also, a partial TS extracted by the demultiplexer 216 or a partial TS played by the DVD/BD drive 219 or the HDD 220 can be sent to a network. In this case, after the partial TS is encrypted by the DTCP circuit 226, the partial TS is output via the Ethernet interface 224 to the network terminal 225. Alternatively, in this case, after the partial TS is encrypted by the DTCP circuit 226, the partial TS is output through the Ethernet interface 224 and the high-speed data line interface 213 to the HDMI terminal 211.

Figure 4:
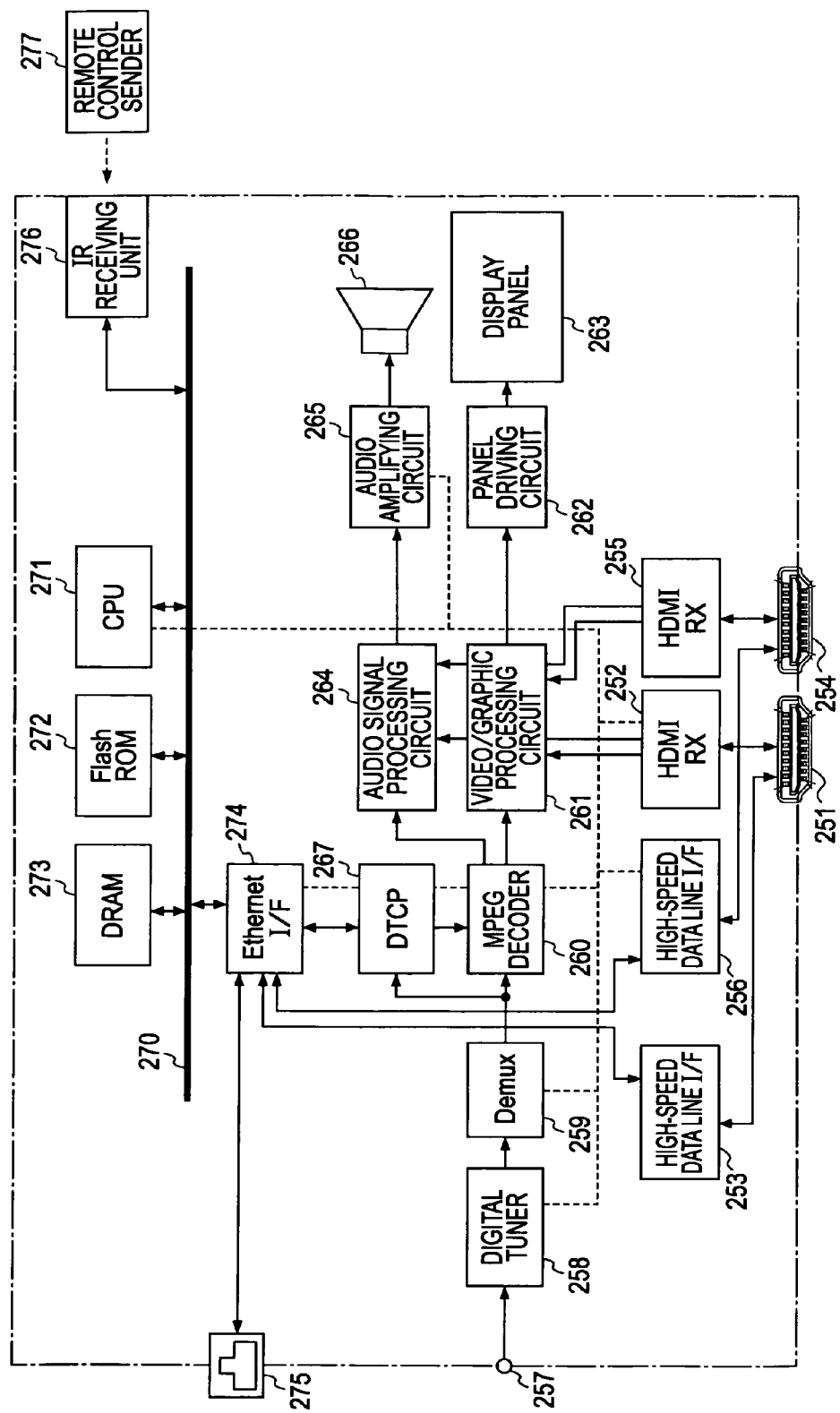
FIG. 4 is a block diagram illustrating a structure example of a television receiver (sink device) constituting the AV system.

FIG. 4 illustrates a structure example of the television receiver 250B. The television receiver 250B includes the HDMI terminals 251 and 254, the HDMI receiving units 252 and 255, the high-speed data line interfaces 253 and 256, an antenna terminal 257, a digital tuner 258, a demultiplexer 259, an MPEG (Moving Picture Expert Group) decoder 260, a video/graphic processing circuit 261, a panel driving circuit 262, a display panel 263, an audio signal processing circuit 264, an audio amplifying circuit 265, a loudspeaker 266, a DTCP circuit 267, an internal bus 270, a CPU 271, a flash ROM 272, a DRAM 273, an Ethernet interface (Ethernet I/F) 274, a network terminal 275, the infrared receiving unit 276, and the remote control sender 277.

The antenna terminal 257 is a terminal to which a television broadcast signal received at a receiving antenna (not illustrated) is input. The digital tuner 258 processes the television broadcast signal input to the antenna terminal 257 and outputs a predetermined transport stream in accordance with a user's selected channel. The demultiplexer 259 extracts, from the transport stream obtained by the digital tuner 258, a partial TS (Transport Stream) (TS packet of video data and TS packet of audio data) in accordance with the user's selected channel.

Also, the demultiplexer 259 extracts, from the transport stream obtained by the digital tuner 258, PSI/SI (Program Specific Information/Service Information) and outputs the PSI/SI to the CPU 271. Multiple channels are multiplexed in the transport stream obtained by the digital tuner 258. The process of extracting a partial TS of an arbitrary channel from the transport stream by using the demultiplexer 259 is made possible by obtaining information of a packet ID (PID) of the arbitrary channel from the PSI/SI (PAT/PMT).

The MPEG decoder 260 performs decoding processing of a video PES (Packetized Elementary Stream) packet constituted by the TS packet of video data obtained by the demultiplexer 259 and obtains video data. Also, the MPEG decoder 260 performs decoding processing of an audio PES packet constituted by the partial TS of audio data obtained by the demultiplexer 259 and obtains audio data. Note that the MPEG decoder 260 performs, as needed, decoding processing of video and audio PES packets obtained by decryption performed by the DTCP circuit 267 and obtains video data and audio data.

The video/graphic processing circuit 261 performs, as needed, multi-screen processing and superimposing processing of graphics data to video data obtained by the MPEG decoder 260. The panel driving circuit 262 drives the display panel 263 on the basis of video data output from the video/graphic processing circuit 261. The display panel 263 is constituted by, for example, an LCD (Liquid Crystal Display) or a PDP (Plasma Display Panel). The audio signal processing circuit 264 performs necessary processing such as D/A conversion of audio data obtained by the MPEG decoder 260. The audio amplifying circuit 265 amplifies an audio signal output from the audio signal processing circuit 264 and supplies the audio signal to the loudspeaker 266.

The DTCP circuit 267 encrypts, as needed, a partial TS extracted by the demultiplexer 259. Also, the DTCP circuit 267 decrypts encrypted data supplied from the network terminal 275 or the high-speed data line interface 253 or 256 to the Ethernet interface 274.

The CPU 271 controls the operation of each unit of the television receiver 250B. The flash ROM 272 stores control software and archives data. The DRAM 273 constitutes a work area for the CPU 271. The CPU 271 expands software and data read from the flash ROM 272 on the DRAM 273, activates the software, and controls each unit of the television receiver 250B. The infrared receiving unit 276 receives a remote control signal (remote control code) sent from the remote control sender 277 and supplies the remote control signal to the CPU 271. The CPU 271, the flash ROM 272, the DRAM 273, and the Ethernet interface 274 are connected to the internal bus 270.

The HDMI receiving units (HDMI sinks) 252 and 255 receive baseband video (image) and audio data supplied to the HDMI terminals 251 and 254 by performing HDMI-based communication. The HDMI receiving units 252 and 255 will be described in detail later. The high-speed data line interfaces 253 and 256 are bidirectional communication interfaces that use predetermined lines (a reserved line and an HPD line in this embodiment) constituting an HDMI cable. The high-speed data line interfaces 253 and 256 will be described in detail later.

The operation of the television receiver 250B illustrated in FIG. 4 will be briefly described.

A television broadcast signal input to the antenna terminal 157 is supplied to the digital tuner 258. In the digital tuner 258, the television broadcast signal is processed to extract a predetermined transport stream in accordance with a user's selected channel, and the predetermined transport stream is supplied to the demultiplexer 259. In the demultiplexer 259, a partial TS (TS packet of video data and TS packet of audio data) in accordance with the user's selected channel is extracted from the transport stream. The partial TS is supplied to the MPEG decoder 260.

In the MPEG decoder 260, decoding processing of a video PES packet constituted by the TS packet of video data is performed to obtain video data. After, for example, multi-screen processing and superimposing processing of graphics data to the video data, if necessary, are performed in the video/graphic processing circuit 261, the video data is supplied to the panel driving circuit 262. Therefore, an image in accordance with the user's selected channel is displayed on the display panel 263.

Also, in the MPEG decoder 260, decoding processing of an audio PES packet constituted by the TS packet of audio data is performed to obtain audio data. In the audio signal processing circuit 264, necessary processing such as D/A conversion is performed on the audio data. Furthermore, the audio data is amplified by the audio amplifying circuit 265, and then supplied to the loudspeaker 266. Therefore, audio in accordance with the user's selected channel is output from the loudspeaker 266.

At the time of reception of the above-described television broadcast signal, a partial TS extracted by the demultiplexer 259 can be sent to a network. In this case, after the partial TS is encrypted by the DTCP circuit 267, the partial TS is output via the Ethernet interface 274 to the network terminal 275. Alternatively, in this case, after the partial TS is encrypted by the DTCP circuit 267, the partial TS is output through the Ethernet interface 274 and the high-speed data line interface 253 or 256 to the HDMI terminal 251 or 254.

Note that, after the encrypted partial TS supplied from the network terminal 275 to the Ethernet interface 274 is decrypted by the DTCP circuit 267, the partial TS is supplied to the MPEG decoder 260. Alternatively, after the encrypted partial TS supplied from the HDMI terminal 251 or 254 via the high-speed data line interface 253 or 256 to the Ethernet interface 274 is decrypted by the DTCP circuit 267, the partial TS is supplied to the MPEG decoder 260. Thereafter, the same operation as that performed at the time the above-described television broadcast signal is received is performed. An image is displayed on the display panel 263, and audio is output from the loudspeaker 266.

Also, in the HDMI receiving units 252 and 255, video (image) data and audio data input through HDMI cables to the HDMI terminals 251 and 254 are obtained. The video data and the audio data are supplied to the video/graphic processing circuit 261 and the audio signal processing circuit 264, respectively. Thereafter, the same operation as that performed at the time the above-described television broadcast signal is received is performed. An image is displayed on the display panel 263, and audio is output from the loudspeaker 266.

Figure 5:
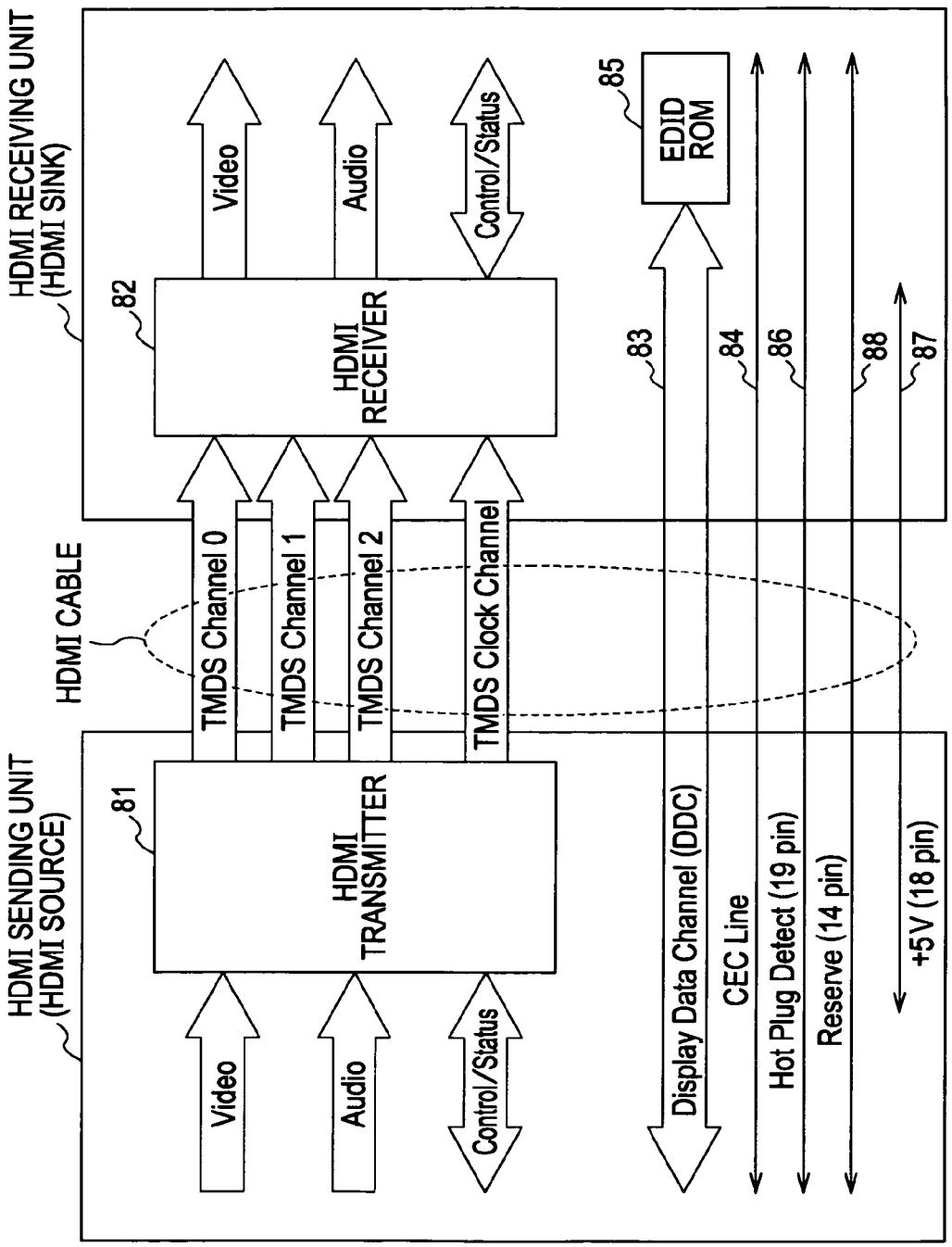
FIG. 5 is a block diagram illustrating a structure example of an HDMI sending unit (HDMI source) and an HDMI receiving unit (HDMI sink).

FIG. 5 illustrates a structure example of an HDMI sending unit (HDMI source) of a source device (photo player 370B or disc recorder 210B) and an HDMI receiving unit (HDMI sink) of a sink device (television receiver 250B).

The HDMI sending unit sends, by using multiple channels, a differential signal corresponding to pixel data of a non-compressed image equivalent to one screen to the HDMI receiving unit in one direction within an effective image section (hereinafter may also be referred to as an active video section) that is a section obtained by removing a horizontal blanking section and a vertical blanking section from a section from one vertical synchronization signal to the next vertical synchronization signal. At the same time, the HDMI sending unit sends, by using multiple channels, at least differential signals corresponding to audio data, control data, and other auxiliary data accompanying the image to the HDMI receiving unit in one direction within the horizontal blanking section or the vertical blanking section.

That is, the HDMI sending unit includes a transmitter 81. The transmitter 81 converts, for example, pixel data of a non-compressed image into a corresponding differential signal, and performs serial transmission of the differential signal in one direction to the HDMI receiving unit connected thereto via an HDMI cable by using three TMDS channels #0, #1, and #2 which are multiple channels.

Also, the transmitter 81 converts audio data, and furthermore, necessary control data, other auxiliary data, and the like accompanying the non-compressed image into corresponding differential signals, and performs serial transmission of the differential signals in one direction to the HDMI receiving unit connected thereto via the HDMI cable by using the three TMDS channels #0, #1, and #2.

Furthermore, the transmitter 81 sends a pixel clock synchronized with pixel data to be sent by using the three TMDS channels #0, #1, and #2 to the HDMI receiving unit connected thereto via the HDMI cable by using a TMDS clock channel. Here, 10-bit pixel data is sent within one pixel clock by using one TMDS channel #i (i=0, 1, 2).

The HDMI receiving unit receives a differential signal corresponding to pixel data, which is sent, by using multiple channels, from the HDMI sending unit in one direction within the active video section. At the same time, the HDMI receiving unit receives differential signals corresponding to audio data and control data, which are sent, by using multiple channels, from the HDMI sending unit in one direction within the horizontal blanking section or the vertical blanking section.

That is, the HDMI receiving unit includes a receiver 82. The receiver 82 receives a differential signal corresponding to pixel data and differential signals corresponding to audio data and control data, which are sent in one direction, by using the TMDS channels #0, #1, and #2, from the HDMI sending unit connected thereto via the HDMI cable, in synchronization with a pixel clock which is also sent from the HDMI sending unit by using the TMDS clock channel.

Transmission channels of an HDMI system including the HDMI sending unit and the HDMI receiving unit include, besides the three TMDS channels #0 to #2 serving as transmission channels for serially transmitting, in one direction from the HDMI sending unit to the HDMI receiving unit, pixel data and audio data in synchronization with a pixel clock, and the TMDS clock channel serving as a transmission channel for transmitting a pixel clock, transmission channels called a DDC (Display Data Channel) 83 and a CEC line 84.

The DDC 83 includes two signal lines, which are not illustrated, included in the HDMI cable. The DDC 83 is used for the HDMI sending unit to read E-EDID (Enhanced Extended Display Identification Data) from the HDMI receiving unit connected thereto via the HDMI cable.

That is, the HDMI receiving unit includes, besides the HDMI receiver 82, an EDID ROM (Read Only Memory) 85 that stores E-EDID which is performance information regarding its performance (Configuration/capability). The HDMI sending unit reads, via the DDC 83, E-EDID of the HDMI receiving unit from the HDMI receiving unit connected thereto via the HDMI cable, and, on the basis of the E-EDID, recognizes, for example, an image format (profile) to which an electronic device including the HDMI receiving unit corresponds, such as RGB, YCbCr4:4:4, or YCbCr4:2:2.

The CEC line 84 includes a signal line, which is not illustrated, included in the HDMI cable. The CEC line 84 is used for performing bidirectional communication of control data between the HDMI sending unit and the HDMI receiving unit.

Also, a line 86 connected to a pin called HPD (Hot Plug Detect) is included in the HDMI cable. The source device can detect connection of the sink device by using the line 86. Also, a line 87 used for supplying power from the source device to the sink device is included in the HDMI cable. Furthermore, a reserved line 88 is included in the HDMI cable.

Figure 6:
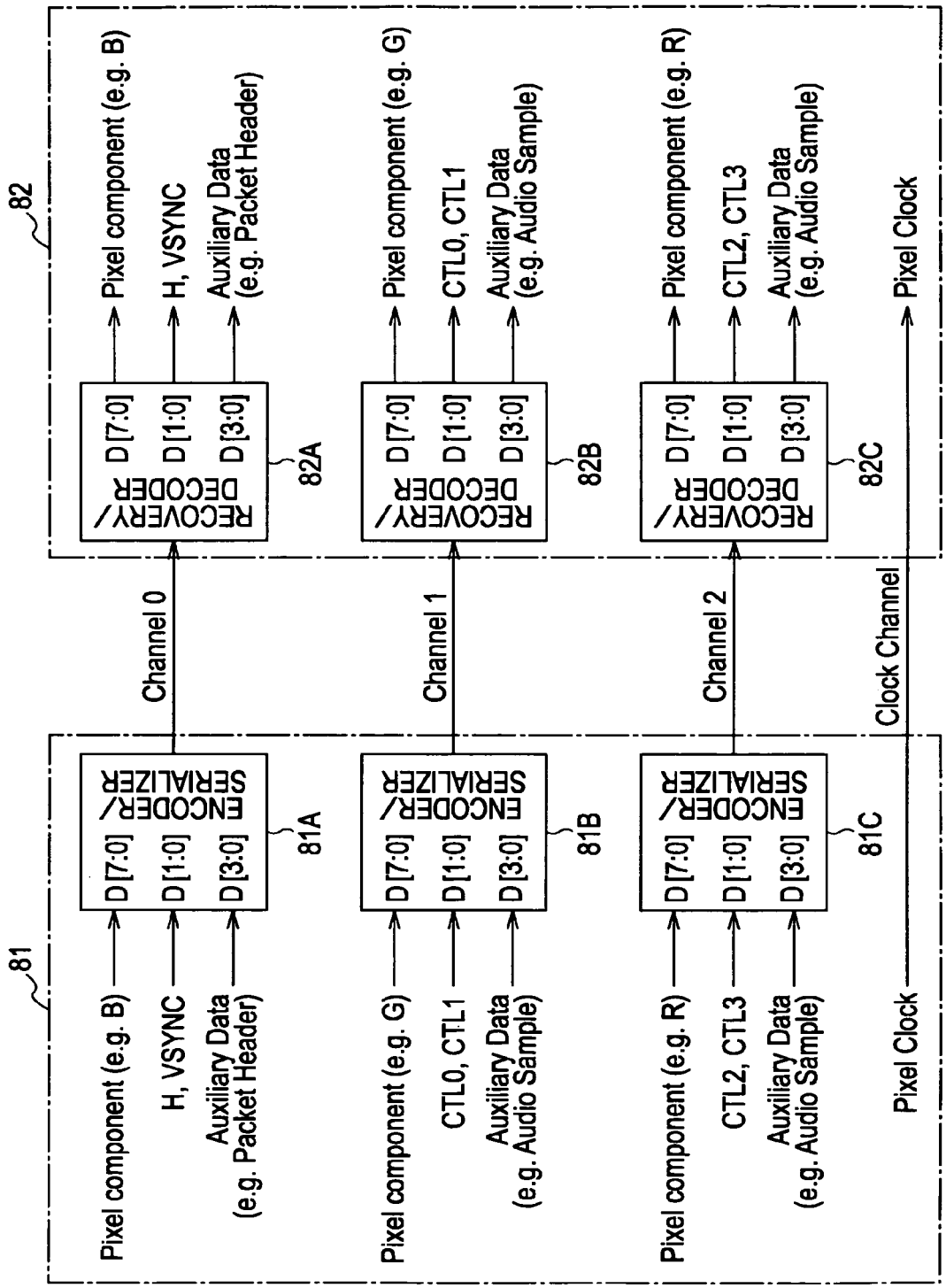
FIG. 6 is a block diagram illustrating a structure example of an HDMI transmitter and an HDMI receiver.

FIG. 6 illustrates a structure example of the HDMI transmitter 81 and the HDMI receiver 82 of FIG. 5.

The transmitter 81 includes three encoders/serializers 81A, 81B, and 81C corresponding to the three TMDS channels #0, #1, and #2, respectively. Each of the encoders/serializers 81A, 81B, and 81C encodes image data, auxiliary data, and control data supplied thereto, converts parallel data into serial data, and sends the serial data in terms of differential signals. Here, when image data includes three components R (red), G (green), and B (blue), the B component is supplied to the encoder/serializer 81A; the G component is supplied to the encoder/serializer 81B; and the R component is supplied to the encoder/serializer 81C.

Also, auxiliary data includes, for example, audio data and a control packet. The control packet is supplied to, for example, the encoder/serializer 81A, and the audio data is supplied to the encoders/serializers 81B and 81C.

Furthermore, control data includes a 1-bit vertical synchronization signal (VSYNC), a 1-bit horizontal synchronization signal (HSYNC), and 1-bit control bits CTL0, CTL1, CTL2, and CTL3. The vertical synchronization signal and the horizontal synchronization signal are supplied to the encoder/serializer 81A. The control bits CTL0 and CTL1 are supplied to the encoder/serializer 81B. The control bits CTL2 and CTL3 are supplied to the encoder/serializer 81C.

The encoder/serializer 81A sends, in a time-division manner, the B component of image data, the vertical synchronization signal, the horizontal synchronization signal, and the auxiliary data, which are supplied thereto. That is, the encoder/serializer 81A converts the B component of image data supplied thereto into parallel data in increments of 8 bits that is a fixed number of bits. Furthermore, the encoder/serializer 81A encodes the parallel data, converts the parallel data into serial data, and sends the serial data by using the TMDS channel #0.

Also, the encoder/serializer 81A encodes 2-bit parallel data including the vertical synchronization signal and the horizontal synchronization signal supplied thereto, converts the parallel data into serial data, and sends the serial data by using the TMDS channel #0. Furthermore, the encoder/serializer 81A converts the auxiliary data supplied thereto into parallel data in increments of 4 bits. The encoder/serializer 81A encodes the parallel data, converts the parallel data into serial data, and sends the serial data by using the TMDS channel #0.

The encoder/serializer 81B sends, in a time-division manner, the G component of image data, the control bits CTL0 and CTL1, and the auxiliary data, which are supplied thereto. That is, the encoder/serializer 81B converts the G component of image data supplied thereto into parallel data in increments of 8 bits that is a fixed number of bits. Furthermore, the encoder/serializer 81B encodes the parallel data, converts the parallel data into serial data, and sends the serial data by using the TMDS channel #1.

Also, the encoder/serializer 81B encodes 2-bit parallel data including the control bits CTL0 and CTL1 supplied thereto, converts the parallel data into serial data, and sends the serial data by using the TMDS channel #1. Furthermore, the encoder/serializer 81B converts the auxiliary data supplied thereto into parallel data in increments of 4 bits. The encoder/serializer 81B encodes the parallel data, converts the parallel data into serial data, and sends the serial data by using the TMDS channel #1.

The encoder/serializer 81C sends, in a time-division manner, the R component of image data, the control bits CTL2 and CTL3, and the auxiliary data, which are supplied thereto. That is, the encoder/serializer 81C converts the R component of image data supplied thereto into parallel data in increments of 8 bits that is a fixed number of bits. Furthermore, the encoder/serializer 81C encodes the parallel data, converts the parallel data into serial data, and sends the serial data by using the TMDS channel #2.

Also, the encoder/serializer 81C encodes 2-bit parallel data including the control bits CTL2 and CTL3 supplied thereto, converts the parallel data into serial data, and sends the serial data by using the TMDS channel #2. Furthermore, the encoder/serializer 81C converts the auxiliary data supplied thereto into parallel data in increments of 4 bits. The encoder/serializer 81C encodes the parallel data, converts the parallel data into serial data, and sends the serial data by using the TMDS channel #2.

The receiver 82 includes three recovery/decoders 82A, 82B, and 82C corresponding to the three TMDS channels #0, #1, and #2, respectively. The recovery/decoders 82A, 82B, and 82C individually receive image data, auxiliary data, and control data sent in terms of differential signals by using the TMDS channels #0, #1, and #2. Furthermore, the recovery/decoders 82A, 82B, and 82C individually convert the image data, the auxiliary data, and the control data from serial data into parallel data, decode the parallel data, and output the decoded data.

That is, the recovery/decoder 82A receives the B component of image data, the vertical synchronization signal, the horizontal synchronization signal, and the auxiliary data, which are sent thereto in terms of differential signals by using the TMDS channel #0. The recovery/decoder 82A converts the B component of image data, the vertical synchronization signal, the horizontal synchronization signal, and the auxiliary data from serial data into parallel data, decodes the parallel data, and outputs the decoded data.

The recovery/decoder 82B receives the G component of image data, the control bits CTL0 and CTL1, and the auxiliary data, which are sent thereto in terms of differential signals by using the TMDS channel #1. The recovery/decoder 82B converts the G component of image data, the control bits CTL0 and CTL1, and the auxiliary data from serial data into parallel data, decodes the parallel data, and outputs the decoded data.

The recovery/decoder 82C receives the R component of image data, the control bits CTL2 and CTL3, and the auxiliary data, which are sent thereto in terms of differential signals by using the TMDS channel #2. The recovery/decoder 82C converts the R component of image data, the control bits CTL2 and CTL3, and the auxiliary data from serial data into parallel data, decodes the parallel data, and outputs the decoded data.

Figure 7:
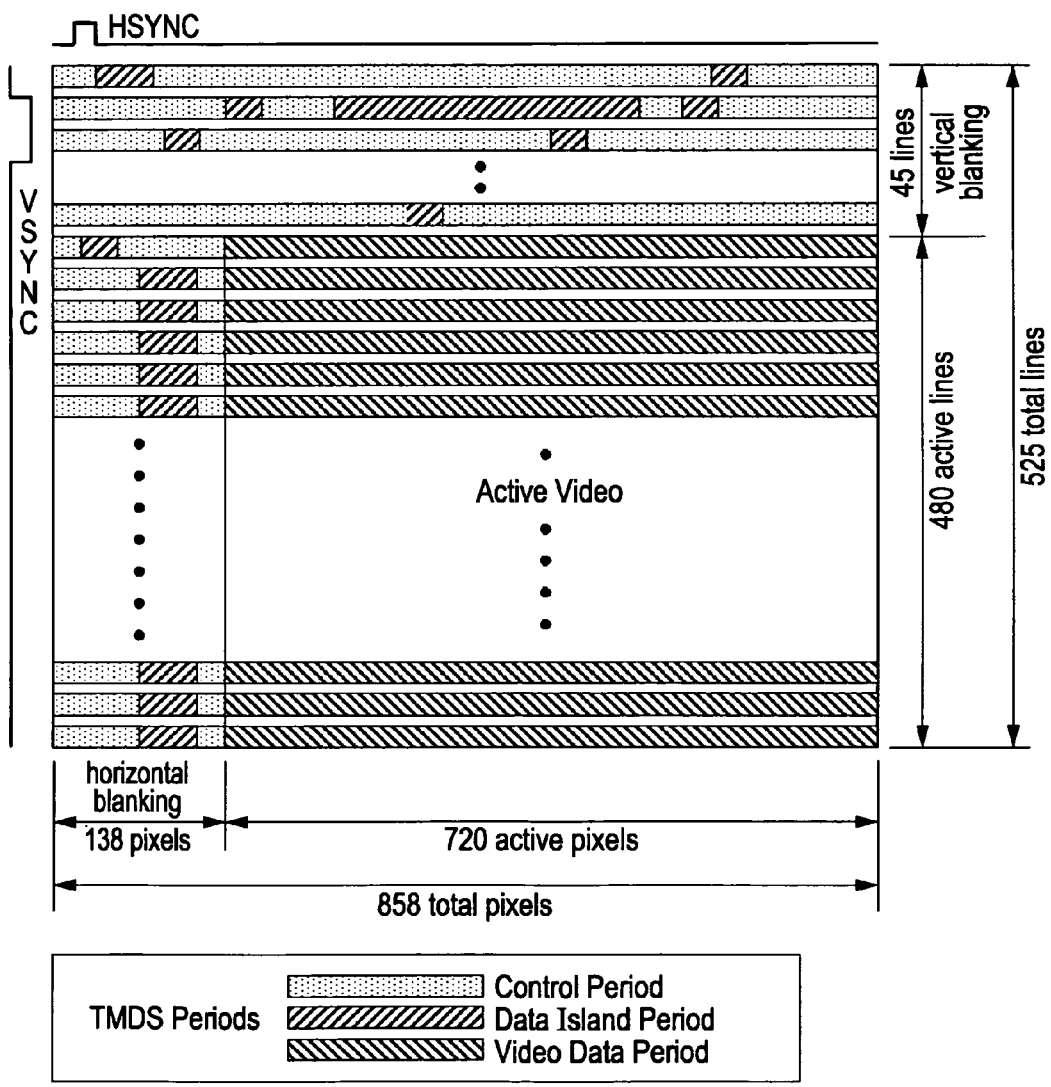
FIG. 7 is a diagram illustrating the structure of TMDS transmission data.

FIG. 7 illustrates an example of a transmission section (period) in which various items of transmission data are transmitted by using the three TMDS channels #0, #1, and #2 of HDMI. Note that FIG. 7 illustrates a section of various items of transmission data in the case where a progressive image having 720×480 pixels (horizontal×vertical) is transmitted by using the TMDS channels #0, #1, and #2.

In a Video Field in which transmission data is transmitted by using the three TMDS channels #0, #1, and #2 of HDMI, three types of sections including a video data section (Video Data period), a data island section (Data Island period), and a control section (Control period) are present in accordance with the type of transmission data.

Here, the video field section is a section from the rising edge of a certain vertical synchronization signal to the rising edge (active edge) of the next vertical synchronization signal. The video field section can be divided into a horizontal blanking period (horizontal blanking), a vertical blanking period (vertical blanking), and an active video section (Active Video) that is a section obtained by removing the horizontal blanking period and the vertical blanking period from the video field section.

The video data section is assigned to the active video section. In the video data section, data of effective pixels (Active pixels) equivalent to 720 pixels×480 lines constituting non-compressed image data equivalent to one screen is transmitted.

The data island section and the control section are assigned to the horizontal blanking period and the vertical blanking period. In the data island section and the control section, Auxiliary data is transmitted.

That is, the data island section is assigned to portions of the horizontal blanking period and the vertical blanking period. In the data island section, among items of auxiliary data, for example, an audio data packet that is data unrelated to control is transmitted.

The control section is assigned to the remaining portions of the horizontal blanking period and the vertical blanking period. In the control section, among items of auxiliary data, for example, a vertical synchronization signal, a horizontal synchronization signal, and a control packet that are items of data related to control are transmitted.

Here, in the current HDMI, the frequency of a pixel clock transmitted by using a TMDS clock channel is, for example, 165 MHz. In this case, the transmission rate in the data island section is about 500 Mbps.

FIG. 8 illustrates a pin arrangement of an HDMI terminal. The pin arrangement is an example of type A (type-A).

Two lines that are differential lines through which TMDS Data#i+ and TMDS Data#i− that are differential signals of a TMDS channel #i are transmitted are connected to pins to which TMDS Data#i+ is assigned (pins whose pin numbers are 1, 4, and 7) and pins to which TMDS Data#i− is assigned (pins whose pin numbers are 3, 6, and 9).

Also, the CEC line 84 through which a CEC signal that is control data is transmitted is connected to a pin whose pin number is 13. A pin whose pin number is 14 is an empty (Reserved) pin. Also, a line through which an SDA (Serial Data) signal such as E-EDID is transmitted is connected to a pin whose pin number is 16. A line through which an SCL (Serial Clock) signal that is a clock signal used for achieving synchronization at the time of sending/receiving an SDA signal is connected to a pin whose pin number is 15. The above-described DDC 83 is constituted by the line through which the SDA signal is transmitted and the line through which the SCL signal is transmitted.

Also, the line 86 for, as described above, the source device to detect connection of the sink device is connected to a pin number whose pin number is 19. Also, the line 87 for, as described above, supplying power is connected to a pin whose pin number is 18.

Figure 9:
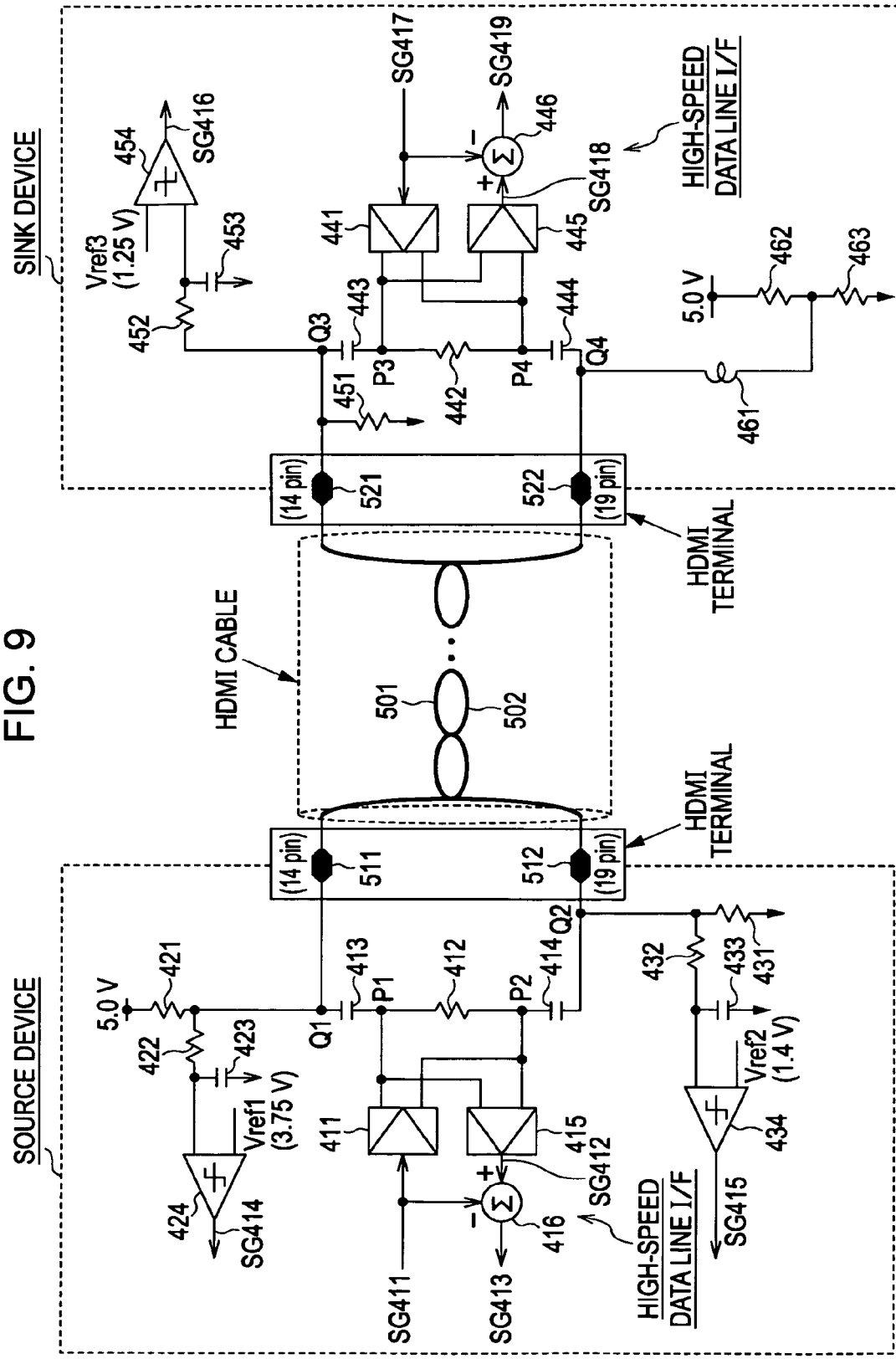
FIG. 9 is a connection diagram illustrating a structure example of high-speed data line interfaces of a source device and a sink device.

FIG. 9 illustrates a structure example of high-speed data line interfaces of a source device and a sink device. The high-speed data line interfaces constitute a communication unit that performs LAN (Local Area Network) communication. The communication unit performs communication by using a bidirectional communication channel constituted by a pair of differential lines among multiple lines constituting the HDMI cable, that is, a reserved line (Ether-line) corresponding to an empty (Reserve) pin (14 pin) and an HPD line (Ether+line) corresponding to an HPD pin (19 pin) in this embodiment.

The source device includes a LAN signal sending circuit 411, a terminating resistor 412, AC coupling capacitors 413 and 414, a LAN signal receiving circuit 415, a subtracting circuit 416, a pull-up resistor 421, a resistor 422 and a capacitor 423 constituting a low-pass filter, a comparator 424, a pull-down resistor 431, a resistor 432 and a capacitor 433 forming a low-pass filter, and a comparator 434. Here, the high-speed data line interface (high-speed data line I/F) is constituted by the LAN signal sending circuit 411, the terminating resistor 412, the AC coupling capacitors 413 and 414, the LAN signal receiving circuit 415, and the subtracting circuit 416.

A series circuit including the pull-up resistor 421, the AC coupling capacitor 413, the terminating resistor 412, the AC coupling capacitor 414, and the pull-down resistor 431 is connected between a power line (+5.0 V) and a ground line. A node P1 between the AC coupling capacitor 413 and the terminating resistor 412 is connected to a positive output side of the LAN signal sending circuit 411 and, to a positive input side of the LAN signal receiving circuit 415. Also, a node P2 between the AC coupling capacitor 414 and the terminating resistor 412 is connected to a negative output side of the LAN signal sending circuit 411 and to a negative input side of the LAN signal receiving circuit 415. A sending signal (sending data) SG411 is supplied to an input side of the LAN signal sending circuit 411.

Also, an output signal SG412 of the LAN signal receiving circuit 415 is supplied to a positive-side terminal of the subtracting circuit 416. The sending signal (sending data) SG411 is supplied to a negative-side terminal of the subtracting circuit 416. In the subtracting circuit 416, the sending signal SG411 is subtracted from the output signal SG412 of the LAN signal receiving circuit 415, thereby obtaining a receiving signal (receiving data) SG413.

Also, a node Q1 between the pull-up resistor 421 and the AC coupling capacitor 413 is connected to the ground line via a series circuit including the resistor 422 and the capacitor 423. An output signal of the low-pass filter obtained at the node between the resistor 422 and the capacitor 423 is supplied to one of two input terminals of the comparator 424. In the comparator 424, the output signal of the low-pass filter is compared with a reference voltage Vref1 (+3.75 V) supplied to the other input terminal. An output signal SG414 of the comparator 424 is supplied to a control unit (CPU) of the source device.

Also, a node Q2 between the AC coupling capacitor 414 and the pull-down resistor 431 is connected to the ground line via a series circuit including the resistor 432 and the capacitor 433. An output signal of the low-pass filter obtained at the node between the resistor 432 and the capacitor 433 is supplied to one of two input terminals of the comparator 434. In the comparator 434, the output signal of the low-pass filter is compared with a reference voltage Vref2 (+1.4 V) supplied to the other input terminal. An output signal SG415 of the comparator 434 is supplied to the control unit (CPU) of the source device.

The sink device includes a LAN signal sending circuit 441, a terminating resistor 442, AC coupling capacitors 443 and 444, a LAN signal receiving circuit 445, a subtracting circuit 446, a pull-down resistor 451, a resistor 452 and a capacitor 453 constituting a low-pass filter, a comparator 454, a choke coil 461, a resistor 462, and a resistor 463. Here, the high-speed data line interface (high-speed data line I/F) is constituted by the LAN signal sending circuit 441, the terminating resistor 442, the AC coupling capacitors 443 and 444, the LAN signal receiving circuit 445, and the subtracting circuit 446.

A series circuit including the resistor 462 and the resistor 463 is connected between a power line (+5.0 V) and a ground line. A series circuit including the choke coil 461, the AC coupling capacitor 444, the terminating resistor 442, the AC coupling capacitor 443, and the pull-down resistor 451 is connected between a node between the resistor 462 and the resistor 463 and the ground line.

A node P3 between the AC coupling capacitor 443 and the terminating resistor 442 is connected to a positive output side of the LAN signal sending circuit 441 and to a positive input side of the LAN signal receiving circuit 445. Also, a node P4 between the AC coupling capacitor 444 and the terminating resistor 442 is connected to a negative output side of the LAN signal sending circuit 441 and to a negative input side of the LAN signal receiving circuit 445. A sending signal (sending data) SG417 is supplied to an input side of the LAN signal sending circuit 441.

Also, an output signal SG418 of the LAN signal receiving circuit 445 is supplied to a positive-side terminal of the subtracting circuit 446. The sending signal SG417 is supplied to a negative-side terminal of the subtracting circuit 446. In the subtracting circuit 446, the sending signal SG417 is subtracted from the output signal SG418 of the LAN signal receiving circuit 445, thereby obtaining a receiving signal (receiving data) SG419.

Also, a node Q3 between the pull-down resistor 451 and the AC coupling capacitor 443 is connected to the ground line via a series circuit including the resistor 452 and the capacitor 453. An output signal of the low-pass filter obtained at the node between the resistor 452 and the capacitor 453 is supplied to one of two input terminals of the comparator 454. In the comparator 454, the output signal of the low-pass filter is compared with a reference voltage Vref3 (+1.25 V) supplied to the other input terminal. An output signal SG416 of the comparator 454 is supplied to a control unit (CPU) of the sink device.

A reserved line 501 and an HPD line 502 included in the HDMI cable constitute a differential twisted pair. A source-side end 511 of the reserved line 501 is connected to a 14-pin of an HDMI terminal of the source device. A sink-side end 521 of the reserved line 501 is connected to a 14-pin of an HDMI terminal of the sink device. Also, a source-side end 512 of the HPD line 502 is connected a 19-pin of an HDMI terminal of the source device. A sink-side end 522 of the HPD line 502 is connected to a 19-pin of an HDMI terminal of the sink device.

In the source device, the above-described node Q1 between the pull-up resistor 421 and the AC coupling capacitor 413 is connected to the 14-pin of the HDMI terminal, and the above-described node Q2 between the pull-down resistor 431 and the AC coupling capacitor 414 is connected to the 19-pin of the HDMI terminal. In contrast, in the sink device, the above-described node Q3 between the pull-down resistor 451 and the AC coupling capacitor 433 is connected to the 14-pin of the HDMI terminal, and the above-described node Q4 between the choke coil 461 and the AC coupling capacitor 444 is connected to the 19-pin of the HDMI terminal.

Next, the operation of LAN communication by using the high-speed data line interfaces structured as described above will be described.

In the source device, the sending signal (sending data) SG411 is supplied to the input side of the LAN signal sending circuit 411, and a differential signal (positive output signal and negative output signal) corresponding to the sending signal SG411 is output from the LAN signal sending circuit 411. The differential signal output from the LAN signal sending circuit 411 is supplied to the nodes P1 and P2, and sent to the sink device through a pair of lines (reserved line 501 and HPD line 502) of the HDMI cable.

Also, in the sink device, the sending signal (sending data) SG417 is supplied to the input side of the LAN signal sending circuit 441, and a differential signal (positive output signal and negative output signal) corresponding to the sending signal SG417 is output from the LAN signal sending circuit 441. The differential signal output from the LAN signal sending circuit 441 is supplied to the nodes P3 and P4, and sent to the source device through a pair of lines (reserved line 501 and HPD line 502) of the HDMI cable.

Also, in the source device, since the input side of the LAN signal receiving circuit 415 is connected to the nodes P1 and P2, an added signal of a sending signal corresponding to the differential signal (current signal) output from the LAN signal sending circuit 411 and a receiving signal corresponding to the differential signal sent from the sink device as described above is obtained as the output signal SG412 of the LAN signal receiving circuit 415. In the subtracting circuit 416, the sending signal SG411 is subtracted from the output signal SG412 of the LAN signal receiving circuit 415. Therefore, the output signal SG413 of the subtracting circuit 416 corresponds to the sending signal (sending data) SG417 of the sink device.

Also, in the sink device, since the input side of the LAN signal receiving circuit 445 is connected to the nodes P3 and P4, an added signal of a sending signal corresponding to the differential signal (current signal) output from the LAN signal sending circuit 441 and a receiving signal corresponding to the differential signal sent from the source device as described above is obtained as the output signal SG418 of the LAN signal receiving circuit 445. In the subtracting circuit 446, the sending signal SG417 is subtracted from the output signal SG418 of the LAN signal receiving circuit 445. Therefore, the output signal SG419 of the subtracting circuit 416 corresponds to the sending signal (sending data) SG411 of the source device.

As above, bidirectional LAN communication can be performed between the high-speed data line interface of the source device and the high-speed data line interface of the sink device.

Note that, in FIG. 9, besides the above-described LAN communication, the HPD line 502 transmits, with a DC bias level, to the source device the fact that the HDMI cable is connected to the sink device. That is, the resistors 462 and 463 and the choke coil 461 in the sink device bias, via the 19-pin of the HDMI cable, the HPD line 502 to about 4 V when the HDMI cable is connected to the sink device. The source device extracts the DC bias of the HPD line 502 by using the low-pass filter including the resistor 432 and the capacitor 433 and compares the DC bias with the reference voltage Vref2 (e.g., 1.4 V) by using the comparator 434.

When the HDMI cable is not connected to the sink device, the voltage of the 19-pin of the HDMI terminal of the source device is lower than the reference voltage Vref2 since the pull-down resistor 431 is present. In contrast, when the HDMI cable is connected to the sink device, the voltage of the 19-pin of the HDMI terminal of the source device is higher than the reference voltage Vref2. Therefore, the output signal SG415 of the comparator 434 is at a high level when the HDMI cable is connected to the sink device; otherwise, the output signal SG415 of the comparator 434 is at a low level. Accordingly, the control unit (CPU) of the source device can recognize whether or not the HDMI cable is connected to the sink device, on the basis of the output signal SG415 of the comparator 434.

Also, in FIG. 9, the function of mutually recognizing, with the DC bias potential of the reserved line 501, whether devices connected to two ends of the HDMI cable are devices that can perform LAN communication (hereinafter referred to as "e-HDMI-compliant devices") or devices that cannot perform LAN communication (hereinafter referred to as "e-HDMI-non-compliant devices") is included.

As described above, the source device pulls up (+5 V) the reserved line 501 by using the resistor 421, and the sink device pulls down the reserved line 501 by using the resistor 451. The resistors 421 and 451 are not present in e-HDMI-non-compliant devices.

The source device compares, as described above, the DC potential of the reserved line 501, which has passed through the low-pass filter including the resistor 422 and the capacitor 423, with the reference voltage Vref1 by using the comparator 424. When the sink device is an e-HDMI-compliant device and includes the pull-down resistor 451, the voltage of the reserved line 501 becomes 2.5 V. However, when the sink device is an e-HDMI-non-compliant device and includes no pull-down resistor 451, the voltage of the reserved line 501 becomes 5 V because of the presence of the pull-up resistor 421.

Therefore, if the reference voltage Vref1 is, for example, 3.75 V, the output signal SG414 of the comparator 424 is at a low level when the sink device is an e-HDMI-compliant device and otherwise is at a high level. Accordingly, the control unit (CPU) of the source device can recognize whether or not the sink device is an e-HDMI-compliant device on the basis of the output signal SG414 of the comparator 424.

Similarly, the sink device compares, as described above, the DC potential of the reserved line 501, which has passed through the low-pass filter including the resistor 452 and the capacitor 453, with the reference voltage Vref3 by using the comparator 454. When the source device is an e-HDMI-compliant device and includes the pull-up resistor 421, the voltage of the reserved line 501 becomes 2.5 V. However, when the source device is an e-HDMI-non-compliant device and includes no pull-up resistor 421, the voltage of the reserved line 501 becomes 0 V because of the presence of the pull-down resistor 451.

Therefore, if the reference voltage Vref3 is, for example, 1.25 V, the output signal SG416 of the comparator 454 is at a high level when the source device is an e-HDMI-compliant device and otherwise is at a low level. Accordingly, the control unit (CPU) of the sink device can recognize whether or not the source device is an e-HDMI-compliant device on the basis of the output signal SG416 of the comparator 454.

According to the structure example illustrated in FIG. 9, in the interface which performs, by using one HDMI cable, transmission of video and audio data, exchange and authentication of information of connected devices, communication of device control data, and LAN communication, LAN communication is performed with bidirectional communication via a pair of differential transmission paths, and the connection state of the interface is reported by using the DC bias potential of at least one of the transmission paths. Thus, spatial separation in which no SCL line or SDA line is physically used for LAN communication is made possible. As a result, a circuit for LAN communication can be formed independently of the electrical specifications defined for DDC, and stable and reliable LAN communication can be realized at low cost.

Note that the pull-up resistor 421 illustrated in FIG. 9 may be provided in the HDMI cable, instead of the source device. In such a case, terminals of the pull-up resistor 421 are respectively connected to, among lines provided in the HDMI cable, the reserved line 501 and a line (signal line) connected to power supply (power supply potential).

Furthermore, the pull-down resistor 451 and the resistor 463 illustrated in FIG. 9 may be provided in the HDMI cable, instead of the sink device. In such a case, terminals of the pull-down resistor 451 are respectively connected to, among lines provided in the HDMI cable, the reserved line 501 and a line (ground line) connected to ground (reference potential). Also, terminals of the resistor 463 are respectively connected to, among lines provided in the HDMI cable, the HPD line 502 and a line (ground line) connected to ground (reference potential).

Figure 10:
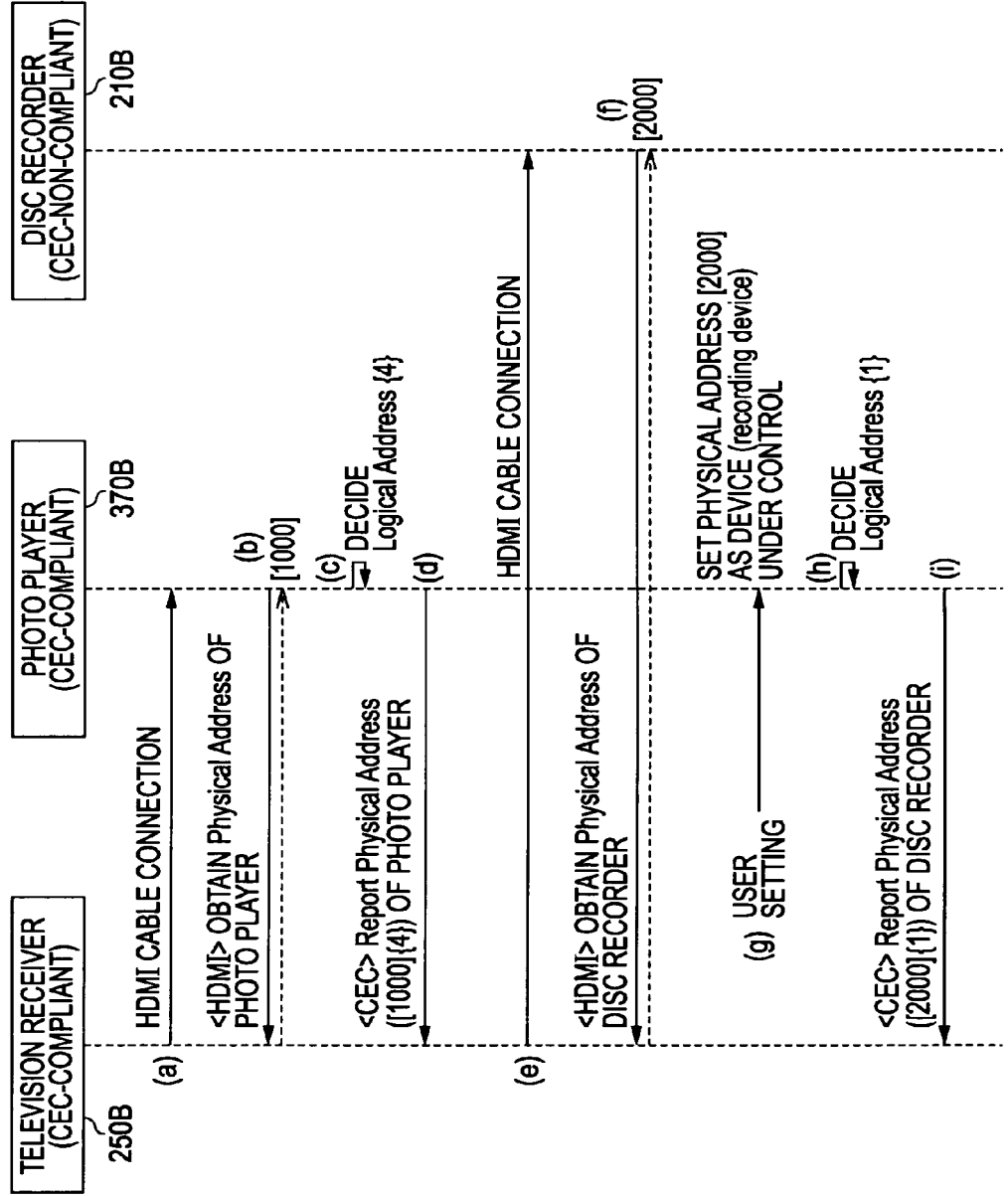
FIG. 10 is a diagram illustrating an example of an operation sequence at the time the photo player and the disc recorder are connected to the television receiver.

FIG. 10 illustrates an example of an operation sequence at the time the photo player 370B and the disc recorder 210B are connected to the television receiver 250B.

a) When the photo player 370B is connected to the television receiver 250B via the HDMI cable 391, (b) the photo player 370B obtains a Physical Address [1000] from the television receiver 250B by using an HDMI control protocol.

(c) Since the photo player 370B itself is a playback device, the photo player 370B decides the logical address {4} as a CEC-controlled Playback Device on the basis of the table of FIG. 26. In this case, after the photo player 370B recognizes that there is no other device that has the logical address {4} by performing Polling Message using the CEC control protocol, the photo player 370B decides the logical address {4} as its logical address.

(d) After the photo player 370B decides the logical address {4} as described above, the photo player 370B notifies the television receiver 250B of the fact that the physical address [1000] is a CEC-compliant device {4} by performing Report Physical Address using the CEC control protocol.

(e) When the disc recorder 210B is connected to the television receiver 250B via the HDMI cable 392, (f) the disc recorder 210B obtains a Physical Address [2000] from the television receiver 250B by using the HDMI control protocol. Here, since the disc recorder 210B is a CEC-non-compliant device, the disc recorder 210B does not perform a CEC logical address deciding operation.

(g) Thereafter, the fact that the physical address is a device (Recording Device) that the photo player 370B controls in place of the physical address [2000] is set by a user in the photo player 370B. The user can perform this setting by using, for example, a user operation unit 374A connected to the CPU 374. (h) In accordance with the above-described setting, the photo player 370B decides the logical address {1} as a CEC-controlled Recording Device on the basis of the table of FIG. 26. In this case, after the photo player 370B recognizes that there is no other device that has the logical address {1} by performing Polling Message using the CEC control protocol, the photo player 370B decides the logical address (1) as a logical address.

(i) After the photo player 370B decides the logical address {1} corresponding to the physical address [2000] as described above, the photo player 370B notifies the television receiver 250B of the fact that the physical address [2000] is a CEC-compliant device {1} by performing Report Physical Address using the CEC control protocol.

Figure 11:
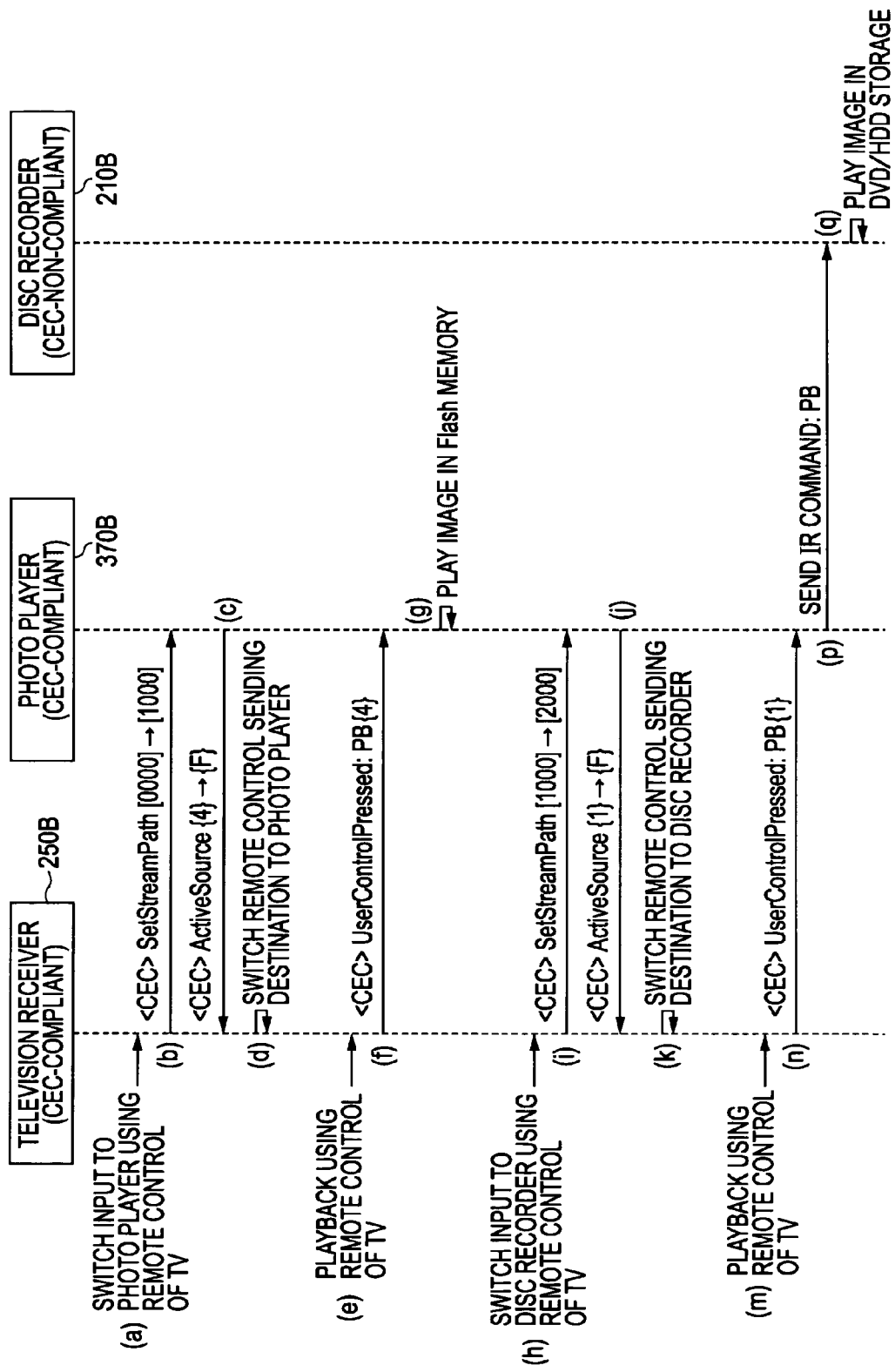
FIG. 11 is a diagram illustrating an example of an operation sequence at the time playback control of the photo player and the disc recorder is performed by using a remote control sender of the television receiver.

FIG. 11 illustrates an example of an operation sequence at the time playback control of the photo player 370B and the disc recorder 210B is performed by using the remote control sender 277 of the television receiver 250B.

(a) When the user switches the input to the photo player 370B by using the remote control sender 277 of the television receiver 250B, (b) the television receiver 250B notifies a connected CEC-compliant device(s) of the fact that the input has been switched from the television receiver 250B to the photo player 370B by performing SetStreamPath[0000]→[1000] using the CEC control protocol.

(c) The photo player 370B with the logical address detects this notification and notifies the connected CEC-compliant device(s) of the fact that the device under control of CEC has been switched to the photo player 370B by performing ActiveSource{4}→{F}. (d) Accordingly, the television receiver 250B switches a remote control sending destination to the photo player 370B.

(e) When the user presses a playback key on the remote control sender 277 of the television receiver 250B, (f) the television receiver 250B notifies the connected CEC-compliant device(s) of UserControlPressed:PB{4} using the CEC control protocol. (g) The photo player 370B with the logical address {4} detects this notification, plays an image in a flash memory, and sends the playback output to the television receiver 250B via the HDMI cable 391. Accordingly, the playback image of the flash memory is displayed on the television receiver 250B.

Next, (h) when the user switches the input to the disc recorder 210B by using the remote control sender 277 of the television receiver 250B, (i) the television receiver 250B notifies the connected CEC-compliant device(s) of the fact that the input has been switched from the photo player 370B to the disc recorder 210B by performing SetStreamPath[1000]→[2000] using the CEC control protocol.

(j) Since CEC control on the physical address [2000] is performed by the photo player 370B in place of the disc recorder 210B, the photo player 370B detects this notification. The photo player 370B notifies the connected CEC-compliant device(s) of the fact that CEC control has been virtually switched to the disc recorder 210B by performing ActiveSource{1}→{F}. (k) Accordingly, the television receiver 250B switches the remote control sending destination to the disc recorder 210B.

(m) When the user presses the playback key on the remote control sender 277 of the television receiver 250B, (n) the television receiver 250B (CPU 271) notifies the connected CEC-compliant device(s) of UserControlPressed:PB{1} using the CEC control protocol. Here, the CPU 271 constitutes a control signal generating unit. (p) Since control on the logical address {1} is performed by the photo player 370B in place of the disc recorder 210B, the photo player 370B detects this notification. The photo player 370B converts a CEC playback command into an infrared remote control command and sends the infrared remote control command by using infrared radiation, thereby notifying the CEC-non-compliant disc recorder 210B. This conversion is performed by, for example, the CPU 374. In this sense, the CPU 374 constitutes a control signal converting unit.

(q) The disc recorder 210B detects this notification, plays an image recorded on a disc, and sends the playback output to the television receiver 250B via the HDMI cable 392. Accordingly, the playback image of the disc is displayed on the television receiver 250B.

Figure 12:
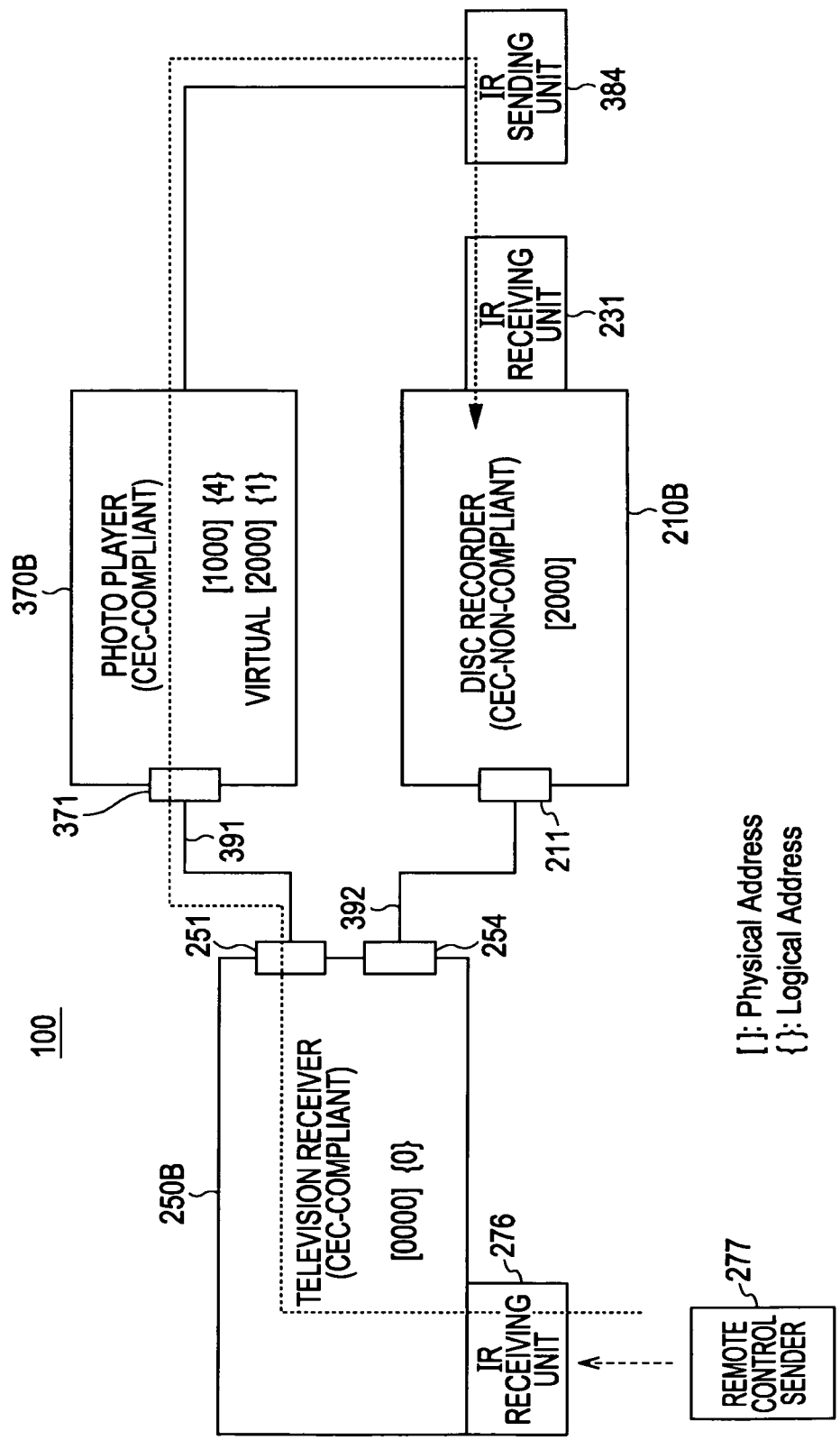
FIG. 12 is a diagram illustrating a channel of playback control of the disc recorder using the remote control sender of the television receiver.
Figure 13:
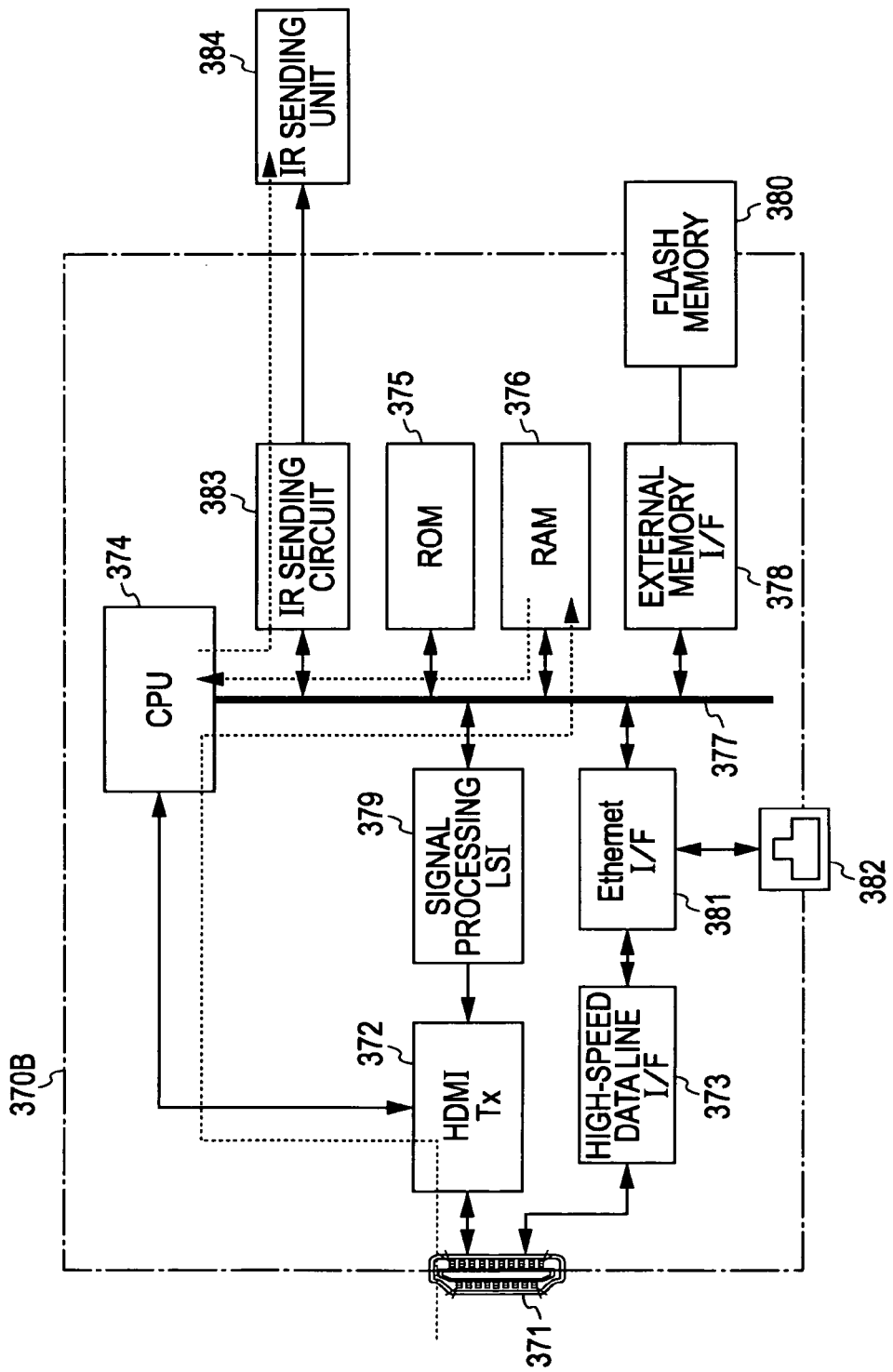
FIG. 13 is a diagram illustrating a channel of playback control in the photo player.

FIG. 12 illustrates, by using a broken line, a channel of playback control of the above-described disc recorder 210B using the remote control sender 277 of the television receiver 250B. FIG. 13 illustrates, by using broken lines, a channel of playback control in the photo player 370B. A CEC playback command (UserControlPressed:PB{1}) sent from the television receiver 250B is supplied from the HDMI sending unit 372 via the CPU 374 to the RAM 376, and is temporarily held in the RAM 376.

The CPU 374 reads and analyzes the CEC control command held in the RAM 376. The CPU 374 controls the infrared sending circuit 383 to convert the CEC playback command into an infrared remote control command, and sends the infrared remote control command as an infrared signal from the infrared sending unit 384.

As described above, in the AV system 100 illustrated in FIG. 1, when the user operates the disc recorder 210B, which is a CEC-non-compliant device, by using the remote control sender 277 of the television receiver 250B, a CEC control command addressed to the disc recorder 210B is generated from the television receiver 250B. In the photo player 370B, the CEC control command is converted into an infrared remote control command, and the infrared remote control command is sent to the disc recorder 210B. Therefore, in the AV system 100 illustrated in FIG. 1, the operation of the disc recorder 210B, which is a CEC-non-compliant device connected to the television receiver 250B, can be controlled by using the remote control sender 277 of the television receiver 250B.

Figure 14:
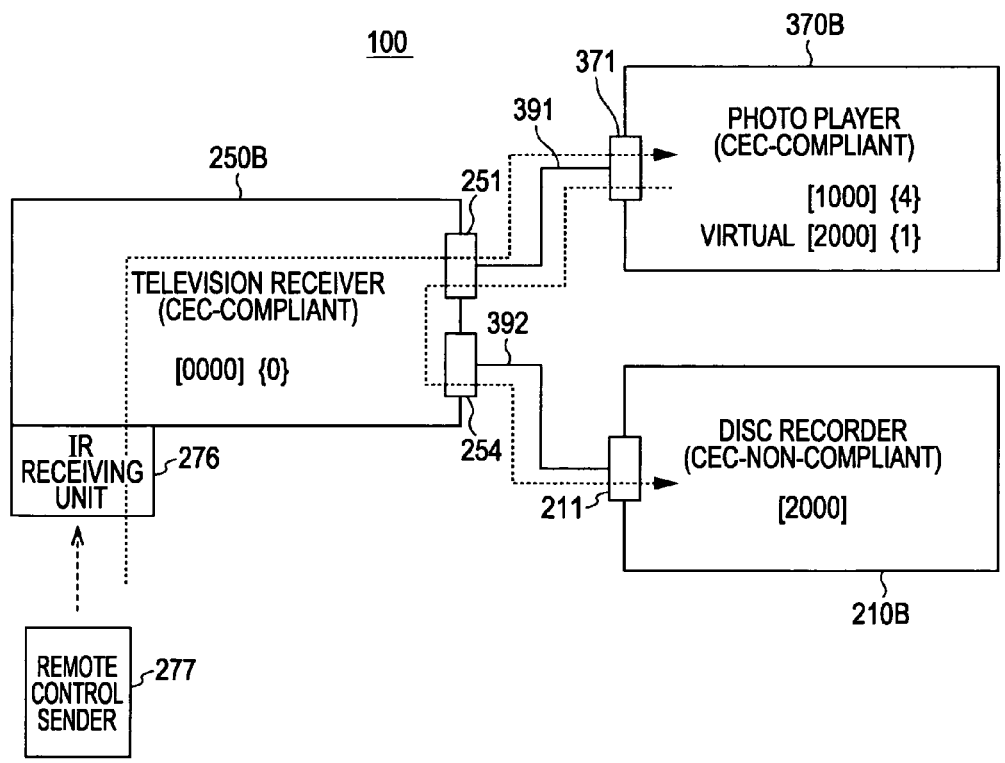
FIG. 14 is a diagram illustrating an example in which a control signal is sent from the photo player to the disc recorder via a bidirectional communication channel constituted by predetermined lines of an HDMI cable.

Note that, in the embodiment illustrated in FIG. 1, the photo player 370B which converts a CEC control command addressed to the disc recorder 210B into an infrared remote control command and sends the infrared remote control command to the disc recorder 210B is illustrated. However, the photo player 370B may convert the CEC control command into a control signal in a predetermined format, and may send the control signal to the disc recorder 210B via a bidirectional communication channel constituted by the reserved line and the HPD line of the HDMI cables 391 and 392, as illustrated in FIG. 14. In this case, the infrared sending circuit 383 and the infrared sending unit 384 become unnecessary in the photo player 370B. Also in this case, the infrared receiving unit 231 becomes unnecessary in the disc recorder 210B.

Figure 15:
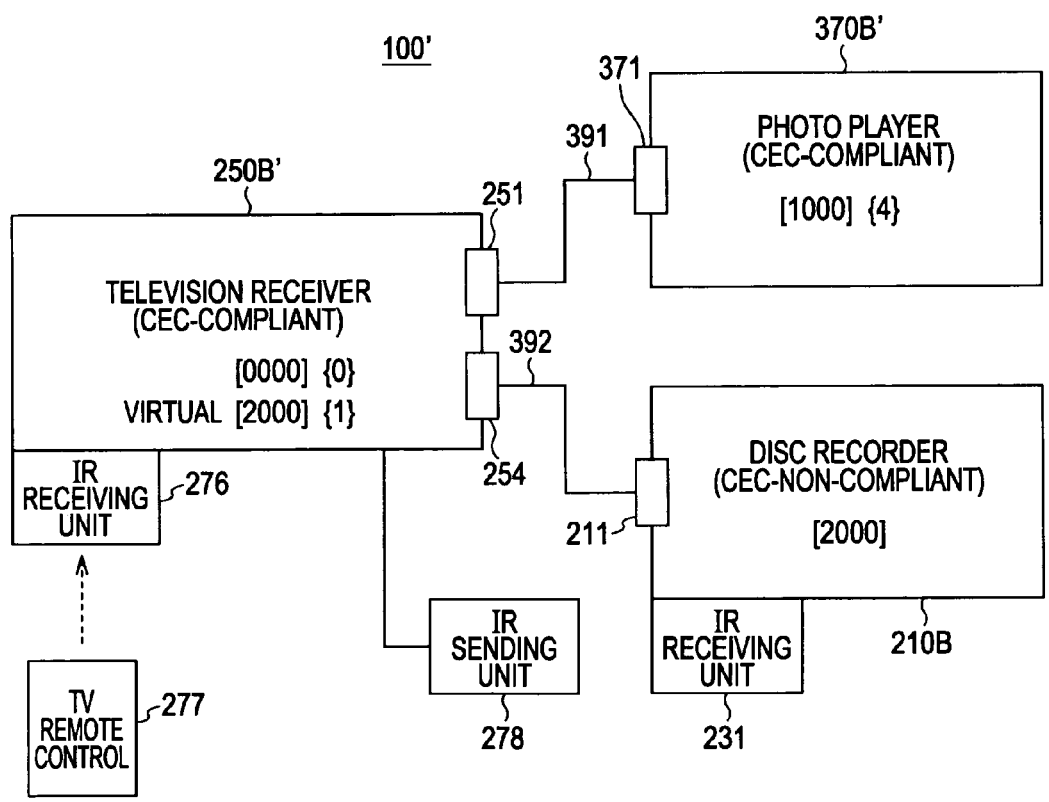
FIG. 15 is a block diagram illustrating a structure example of an AV system serving as another embodiment of the present invention.

Next, another embodiment of the present invention will be described. FIG. 15 illustrates a structure example of an AV system 100' serving as another embodiment of the present invention. In FIG. 15, portions corresponding to FIG. 1 are given the same reference numerals, and detailed descriptions thereof are omitted.

A photo player 370B' and a television receiver 250B' are connected to each other via the HDMI cable 391. That is, one of two ends of the HDMI cable 391 is connected to the HDMI terminal 371 of the photo player 370B', and the other end of the HDMI cable 391 is connected to the HDMI terminal 251 of the television receiver 250B'. Also, the disc recorder 210B and the television receiver 250B' are connected to each other via the HDMI cable 392. That is, one of two ends of the HDMI cable 392 is connected to the HDMI terminal 211 of the disc recorder 210B, and the other end of the HDMI cable 392 is connected to the HDMI terminal 254 of the television receiver 250B'.

The television receiver 250B' is a CEC-compliant device. Besides the infrared receiving unit (IR receiving unit) 276 which receives an infrared remote control signal from the remote control sender 277, the television receiver 250B' includes an infrared sending unit 278 that sends an infrared signal. The television receiver 250B' is a device obtained by adding an infrared sending circuit (not illustrated) and the infrared sending unit 278 to the television receiver 250B in the AV system 100 of FIG. 1. Here, under control of the CPU 271 (see FIG. 4), the infrared sending circuit drives the infrared sending unit 278 and generates an infrared signal.

Also, the photo player 370B' is a CEC-compliant device. The photo player 370B' is a device obtained by removing the infrared sending circuit 383 and the infrared sending unit 384 from the photo player 370B in the AV system 100 of FIG. 1. Also, the disc recorder 210B is a CEC-non-compliant device and includes the infrared receiving unit 231 which receives an infrared signal. The disc recorder 210B is the same as the disc recorder 210B in the AV system 100 of FIG. 1.

In the AV system 100' illustrated in FIG. 15, when the photo player 370B' is connected to the television receiver 250B', the photo player 370B' obtains a Physical Address [1000] from the television receiver 250B' by using the HDMI control protocol. Since the photo player 370B' itself is a playback device, the photo player 370B' decides the logical address {4} as a CEC-controlled Playback Device on the basis of the table of FIG. 26.

Also, in the AV system 100' illustrated in FIG. 15, when the disc recorder 210B is connected to the television receiver 250B', the disc recorder 210B obtains a Physical Address [2000] from the television receiver 250B' by using the HDMI control protocol. Here, since the disc recorder 210B is a CEC-non-compliant device, the disc recorder 210B does not perform a CEC logical address deciding operation.

Thereafter, the fact that the physical address [2000] is a device (Recording Device) that the television receiver 250B' controls in place of the physical address [2000] is set by a user in the television receiver 250B'. In accordance with the above-described setting, the television receiver 250B' decides the logical address {1} as a CEC-controlled Recording Device on the basis of the table of FIG. 26.

FIG. 16 illustrates display examples at the time a user setting of the remote control of the television receiver 250B' is performed. The television receiver 250B' includes the HDMI terminal 251 related to HDMI input 1 and the HDMI terminal 254 related to HDMI input 2. FIG. 16(a) illustrates the case where the position of a cursor CA is at HDMI input 1. The fact that a device (photo player 370B) connected to HDMI input 1 is controlled by a CEC control command is displayed.

FIG. 16(b) illustrates the case where the position of the cursor CA is at HDMI input 2. The fact that a device (disc recorder 210B) connected to HDMI input 2 is controlled by an infrared command is displayed. Here, the user can set that the device (disc recorder 210B) connected to HDMI input 2 is a Recording Device. This setting operation is, as described above, the operation of setting, in the television receiver 250B', that the physical address [2000] is a device (Recording Device) that the television receiver 250B' controls in place of the physical address [2000].

In the AV system 100' illustrated in FIG. 15, when the user presses the playback key after switching the input to the photo player 370B' by using the remote control sender 277 of the television receiver 250B', a CEC playback control command addressed to the photo player 370B' is generated from the television receiver 250B', and is sent to the photo player 370B'. Accordingly, a playback operation starts in the photo player 370B', and played image data is sent via the HDMI cable 391 to the television receiver 250B'. Accordingly, the playback image of the photo player 370B' is displayed on the television receiver 250B'.

Also, in the AV system 100' illustrated in FIG. 15, when the user presses the playback key after switching the input to the disc recorder 210B by using the remote control sender 277 of the television receiver 250B', a CEC playback control command addressed to the disc recorder 210B is generated from the television receiver 250B'. In the television receiver 250B', the CEC playback control command is converted into an infrared command, and the infrared command is sent from the infrared sending unit 278 to the disc recorder 210B. Accordingly, a playback operation starts in the disc recorder 210B, and played image data is sent via the HDMI cable 392 to the television receiver 250B'. Accordingly, the playback image of the disc recorder 210B is displayed on the television receiver 250B'.

As described above, also in the AV system 100' illustrated in FIG. 15, as in the AV system 100 illustrated in FIG. 1, the operation of the disc recorder 210B, which is a CEC-non-compliant device connected to the television receiver 250B', can be controlled by using the remote control sender 277 of the television receiver 250B'.

Note that, in the embodiment illustrated in FIG. 15, the television receiver 250B' which converts a CEC control command addressed to the disc recorder 210B into an infrared remote control command and sends the infrared remote control command to the disc recorder 210B is illustrated. However, the television receiver 250B' may convert the CEC control command into a control signal in a predetermined format, and may send the control signal to the disc recorder 210B via a bidirectional communication channel constituted by the reserved line and the HPD line of the HDMI cable 392. In this case, the infrared sending circuit and the infrared sending unit 278 become unnecessary in the television receiver 250B'. Also in this case, the infrared receiving unit 231 becomes unnecessary in the disc recorder 210B.

Figure 17:
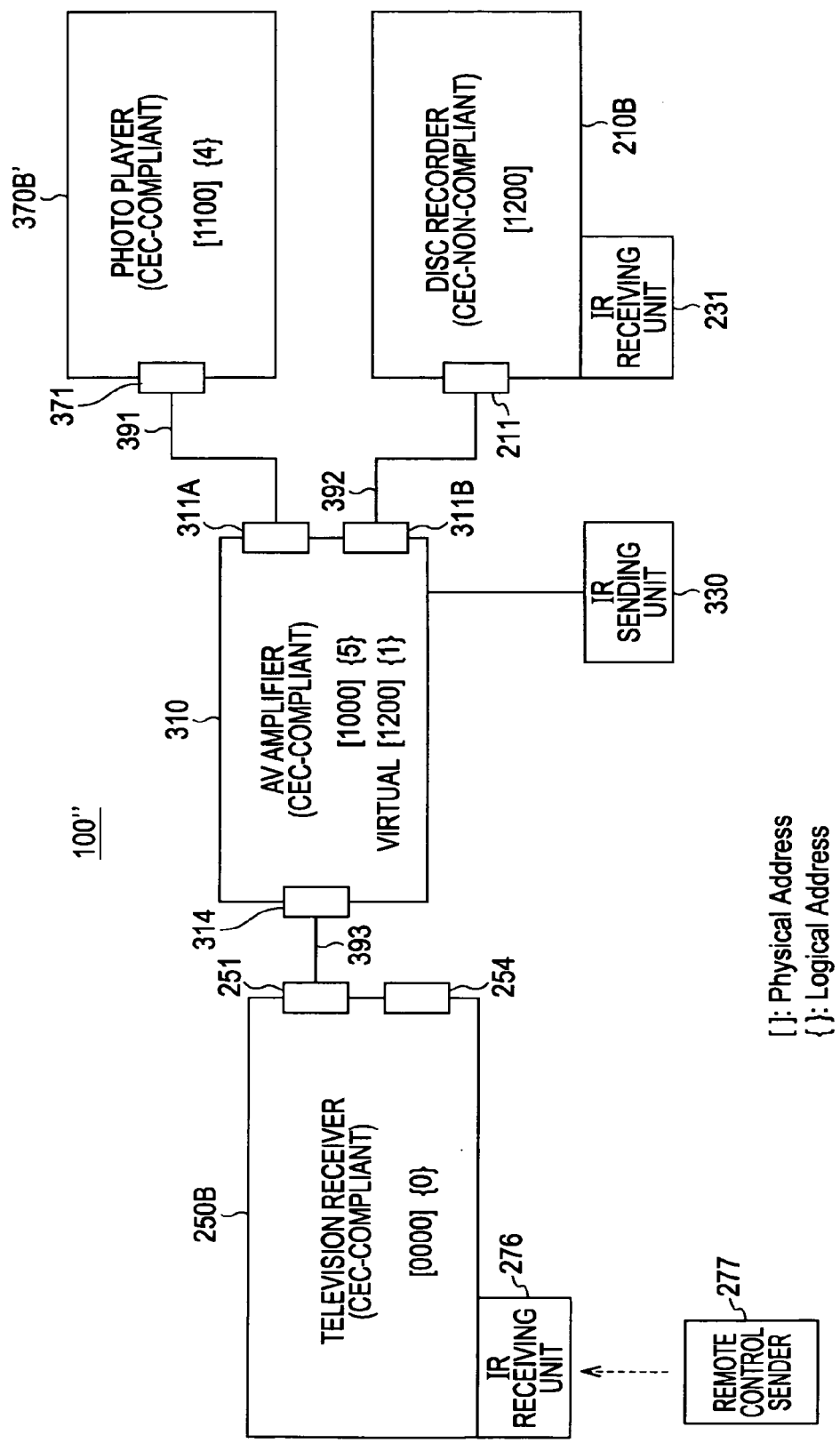
FIG. 17 is a block diagram illustrating a structure example of an AV system serving as another embodiment of the present invention.

Next, another embodiment of the present invention will be described. FIG. 17 illustrates a structure example of an AV system 100" serving as another embodiment of the present invention. In FIG. 17, portions corresponding to FIG. 1 and FIG. 15 are given the same reference numerals, and detailed descriptions thereof are omitted.

The AV system 100" includes the television receiver 250B, the photo player 370B', the disc recorder 210B, and an AV amplifier 310. The photo player 370B' and the disc recorder 210B constitute HDMI source devices. The television receiver 250B constitutes an HDMI sink device. The AV amplifier 310 constitutes an HDMI repeater device.

The television receiver 250B and the AV amplifier 310 are connected to each other via an HDMI cable 393. That is, one of two ends of the HDMI cable 393 is connected to an HDMI terminal 314 of the AV amplifier 310, and the other end of the HDMI cable 393 is connected to the HDMI terminal 251 of the television receiver 250B.

The photo player 370B' and the AV amplifier 310 are connected to each other via the HDMI cable 391. That is, one of two ends of the HDMI cable 391 is connected to the HDMI terminal 371 of the photo player 370B', and the other end of the HDMI cable 391 is connected to an HDMI terminal 311A of the AV amplifier 310. Also, the disc recorder 210B and the AV amplifier 310 are connected to each other via the HDMI cable 392. That is, one of two ends of the HDMI cable 392 is connected to the HDMI terminal 211 of the disc recorder 210B, and the other end of the HDMI cable 392 is connected to an HDMI terminal 311B of the AV amplifier 310.

The television receiver 250B is a CEC-compliant device and includes the infrared receiving unit (IR receiving unit) 276 which receives an infrared remote control signal from the remote control sender 277. The television receiver 250B is the same as the television receiver 250B in the AV system 100 of FIG. 1.

Also, the photo player 370B' is a CEC-compliant device. The photo player 370B' is the same as the photo player 370B' in the AV system 100' of FIG. 15. Also, the disc recorder 210B is a CEC-non-compliant device and includes the infrared receiving unit 231 which receives an infrared signal. The disc recorder 210B is the same as the disc recorder 210B in the AV system 100 of FIG. 1.

Figure 18:
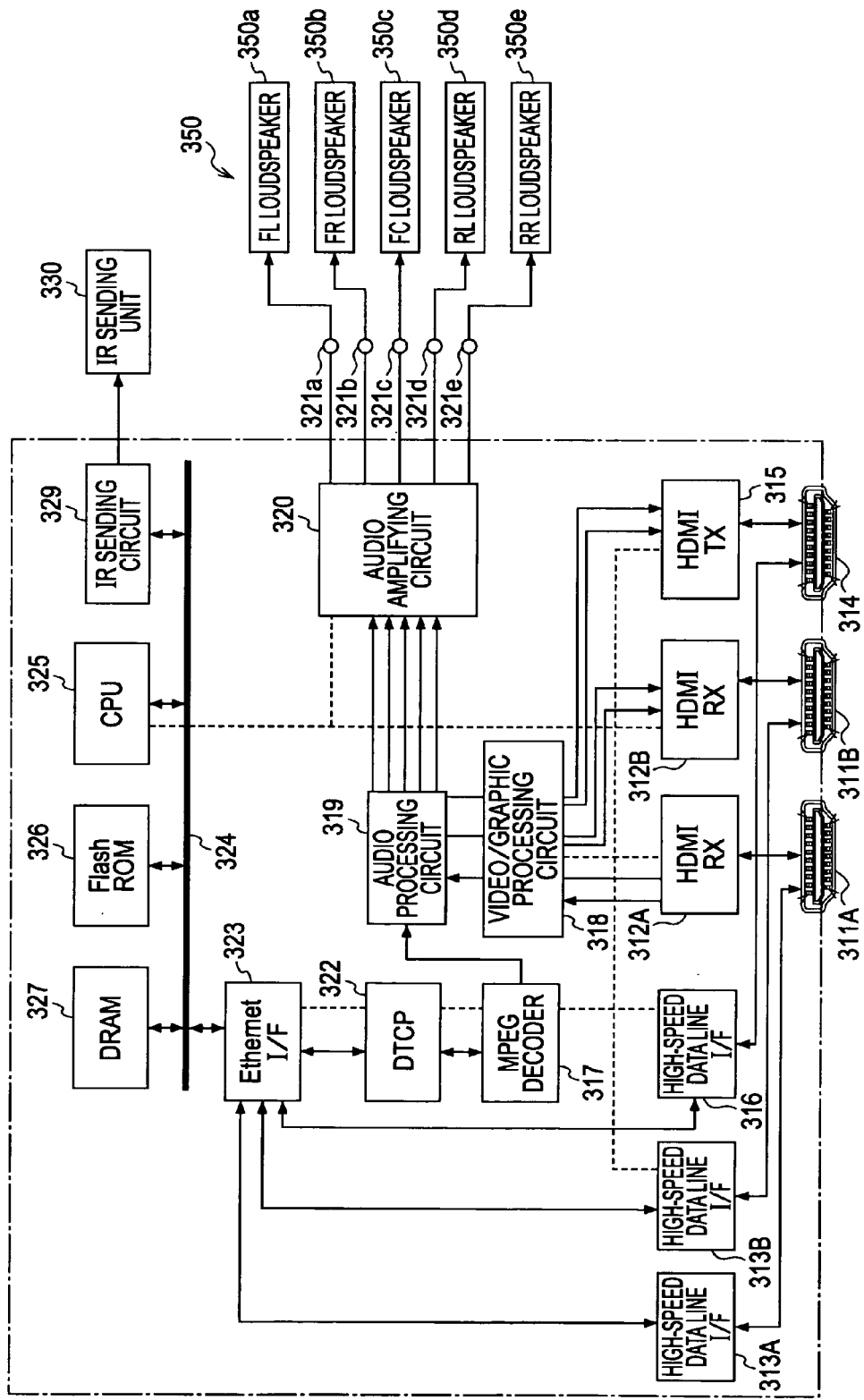
FIG. 18 is a diagram illustrating a structure example of an AV amplifier (repeater device) constituting the AV system.

Also, the AV amplifier 310 is a CEC-compliant device and includes an infrared sending unit 330 that sends an infrared signal. FIG. 18 illustrates a structure example of the AV amplifier 310.

FIG. 18 illustrates a structure example of the AV amplifier 310. The AV amplifier 310 includes the HDMI terminals 311A, 311B, and 314, HDMI receiving units 312A and 312B, an HDMI sending unit 315, high-speed data line interfaces 313A, 313B, and 316, an MPEG decoder 317, a video/graphic processing circuit 318, an audio processing circuit 319, an audio amplifying circuit 320, audio output terminals 321a to 321e, a DTCP circuit 322, an Ethernet interface 323, an internal bus 324, a CPU 325, a flash ROM 326, a DRAM 327, an infrared sending circuit 329, and an infrared sending unit 330.

The HDMI receiving units (HDMI sinks) 312A and 312B receive baseband video (image) and audio data supplied to the HDMI terminals 311A and 311B by performing HDMI-based communication. The HDMI sending unit (HDMI source) 315 sends baseband video (image) and audio data from the HDMI terminal 314 by performing HDMI-based communication. The HDMI receiving units 312A and 312B and the HDMI sending unit 315 are constructed as in the HDMI receiving units and the HDMI sending units of the above-described other devices.

The high-speed data line interfaces 313A, 313B, and 316 are bidirectional communication interfaces that use predetermined lines (a reserved line and an HPD line in this embodiment) constituting an HDMI cable. The high-speed data line interfaces 313A, 313B, and 316 are constructed as in the high-speed data line interfaces of the above-described other devices.

The DTCP circuit 322 decrypts an encrypted partial TS, which is supplied via the high-speed data line interface 313 to the Ethernet interface 323. The MPEG decoder 317 performs decoding processing of an audio PES packet in the partial TS obtained by decryption performed by the DTCP circuit, and obtains audio data.

The audio signal processing circuit 319 performs necessary processing such as D/A conversion of audio data obtained by the MPEG decoder 317. The audio amplifying circuit 320 amplifies a front-left audio signal SFL, a front-right audio signal SFR, a front-center audio signal SFC, a rear-left audio signal SRL, and a rear-right audio signal SRR, and outputs the amplified signals to the audio output terminals 321a, 321b, 321c, 321d, and 321e.

Note that a front-left loudspeaker 350a, a front-right loudspeaker 350b, a front-center loudspeaker 350c, a rear-left loudspeaker 350d, and a rear-right loudspeaker 350e constituting a loudspeaker group 350 are connected to the audio output terminals 321a, 321b, 321c, 321d, and 321e, respectively.

Furthermore, after the audio processing circuit 319 applies necessary processing to audio data obtained by the HDMI receiving unit 312A or 312B, the audio processing circuit 319 sends the processed data to the HDMI sending unit 315. After the video/graphic processing circuit 318 performs processing such as superimposing processing of graphics data to video (image) data obtained by the HDMI receiving unit 312A or 312B, the video/graphic processing circuit 318 supplies the processed data to the HDMI sending unit 315. Accordingly, the audio amplifier 310 exerts a repeater function.

The CPU 325 controls the operation of each unit of the audio amplifier 310. The flash ROM 326 stores control software and archives data. The DRAM 327 constitutes a work area for the CPU 325. The CPU 325 expands software and data read from the flash ROM 326 on the DRAM 327, activates the software, and controls each unit of the audio amplifier 310. The CPU 325, the flash ROM 326, the DRAM 327, and the Ethernet interface 323 are connected to the internal bus 324.

Under control of the CPU 325, the infrared sending circuit 329 drives the infrared sending unit 330 and generates an infrared signal. The infrared sending unit 330 is constituted by, for example, an infrared light-emitting device.

The operation of the AV amplifier 310 illustrated in FIG. 18 will be briefly described.

In the HDMI receiving units 312A and 312B, video (image) data and audio data input through HDMI cables to the HDMI terminals 311A and 311B are obtained. The video data and the audio data are supplied respectively via the video/graphic processing circuit 318 and the audio processing circuit 319 to the HDMI sending unit 315, and sent via an HDMI cable connected to the HDMI terminal 314.

Also, a TS packet of encrypted audio data, which is supplied from the HDMI terminals 311A and 311B via the high-speed data line interfaces 313A and 313B to the Ethernet interface 323, is decrypted by the DTCP circuit 322. In the MPEG decoder, decoding processing is performed on a PES packet of audio data obtained by the DTCP circuit 322, thereby obtaining audio data.

Audio data received by the HDMI receiving units 312A and 312B or audio data obtained by the MPEG decoder 317 is supplied to the audio processing circuit 319, and necessary processing such as D/A conversion is performed on the audio data. When muting is in an off state, the individual audio signals SFL, SFR, SFC, SRL, and SRR output from the audio processing circuit 319 are amplified, and output to the audio output terminals 321a, 321b, 321c, 321d, and 321e. Therefore, audio is output from the loudspeaker group 350.

Figure 19:
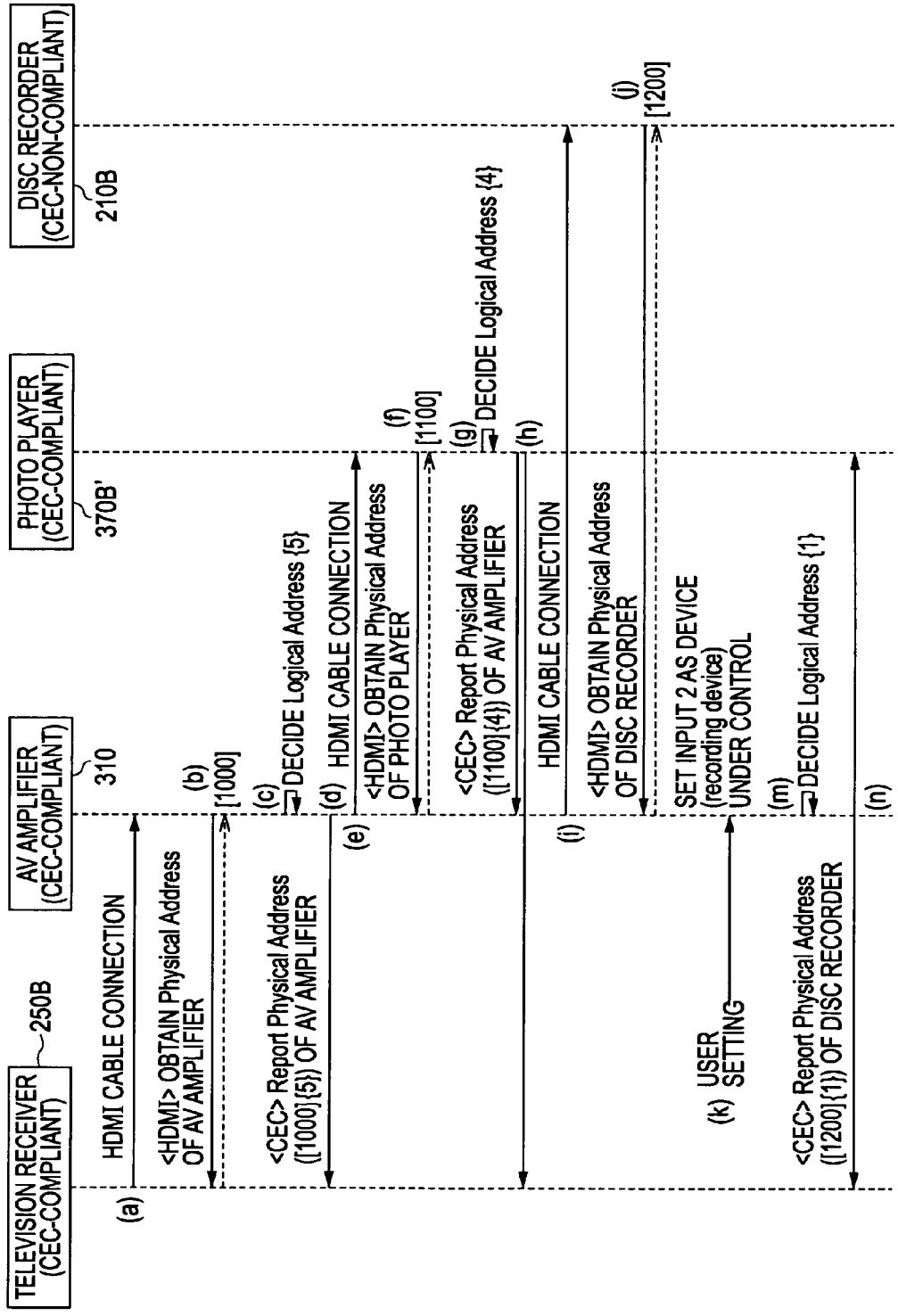
FIG. 19 is a diagram illustrating an example of an operation sequence at the time the AV amplifier is connected to the television receiver and, furthermore, the photo player and the disc recorder are connected to the AV amplifier.

FIG. 19 illustrates an example of an operation sequence at the time the AV amplifier 310 is connected to the television receiver 250B, and further, the photo player 370B' and the disc recorder 210B are connected to the AV amplifier 310.

(a) When the AV amplifier 310 is connected to the television receiver 250B via the HDMI cable 393, (b) the AV amplifier 310 obtains a Physical Address [1000] from the television receiver 250B by using the HDMI control protocol.

(c) The AV amplifier 310 decides the logical address {5} as a CEC-controlled Audio System on the basis of the table of FIG. 26. In this case, after the AV amplifier 310 recognizes that there is no other device that has the logical address {5} by performing Polling Message using the CEC control protocol, the AV amplifier 310 decides the logical address {5} as its logical address.

(d) After the AV amplifier 310 decides the logical address {5} as described above, the AV amplifier 310 notifies the television receiver 250B of the fact that the physical address [1000] is a CEC-compliant device {5} by performing Report Physical Address using the CEC control protocol.

(e) When the photo player 370S' is connected to the AV amplifier 310 via the HDMI cable 391, (f) the photo player 370B' obtains a Physical Address [1100] from the AV amplifier 310 by using the HDMI control protocol.

(g) Since the photo player 370B' itself is a playback device, the photo player 370B' decides the logical address {4} as a CEC-controlled Playback Device on the basis of the table of FIG. 26. In this case, after the photo player 370B' recognizes that there is no other device that has the logical address {4} by performing Polling Message using the CEC control protocol, the photo player 370B' decides the logical address {4} as its logical address.

(h) After the photo player 370B' decides the logical address {4} as described above, the photo player 370B' notifies the television receiver 250B and the AV amplifier 310 of the fact that the physical address [1100] is a CEC-compliant device {4} by performing Report Physical Address using the CEC control protocol.

(i) When the disc recorder 210B is connected to the AV amplifier 310 via the HDMI cable 392, (j) the disc recorder 210B obtains a Physical Address [1200] from the AV amplifier 310 by using the HDMI control protocol. Here, since the disc recorder 210B is a CEC-non-compliant device, the disc recorder 210B does not perform a CEC logical address deciding operation.

(g) Thereafter, the fact that the physical address [1200] is a device (Recording Device) that the AV amplifier 310 controls in place of the physical address [1200] is set by a user in the AV amplifier 310. FIG. 20 illustrates a display example at the time a user setting of the AV amplifier 310 is performed. The AV amplifier 310 includes the HDMI terminal 311A related to HDMI input 1 and the HDMI terminal 311B related to HDMI input 2.

In the display of FIG. 20, the fact that a device (disc recorder 210B) connected to HDMI input 2 is controlled by an infrared command is displayed. Here, the user can set that the device (disc recorder 210B) connected to HDMI input 2 is a Recording Device. This setting operation is, as described above, the operation of setting, in the AV amplifier 310, that the physical address [1200] is a device (Recording Device) that the AV amplifier 310 controls in place of the physical address [1200].

(m) In accordance with the above-described setting, the AV amplifier 310 decides the logical address {1} as a CEC-controlled Recording Device on the basis of the table of FIG. 26. In this case, after the AV amplifier 310 recognizes that there is no other device that has the logical address {1} by performing Polling Message using the CEC control protocol, the AV amplifier 310 decides the logical address {1} as a logical address.

(n) After the AV amplifier 310 decides the logical address {1} corresponding to the physical address [1200] as described above, the AV amplifier 310 notifies the television receiver 250B and the photo player 370B' of the fact that the physical address [1200] is a CEC-compliant device {1} by performing Report Physical Address using the CEC control protocol.

Figure 21:
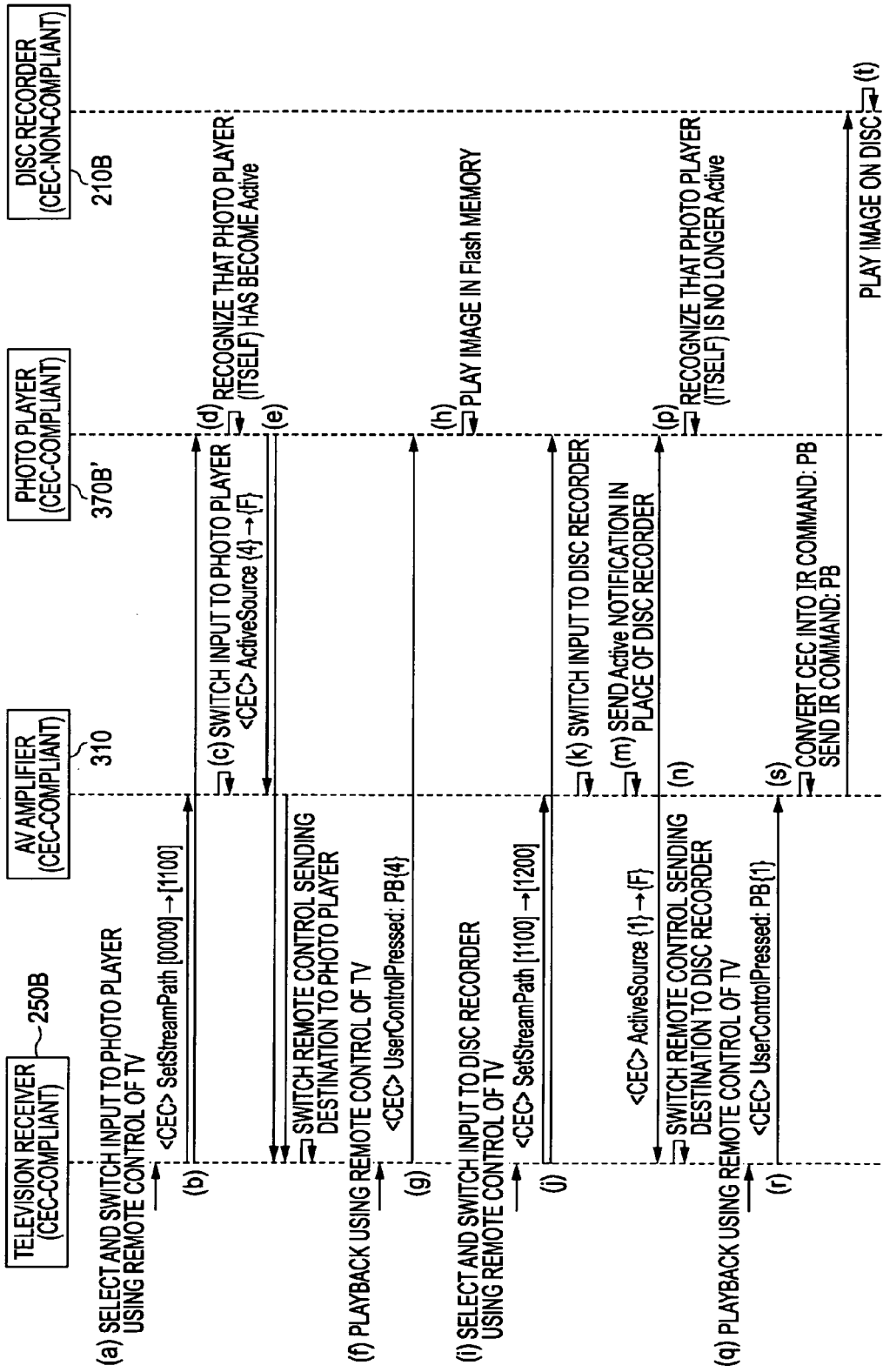
FIG. 21 is a diagram illustrating an example of an operation sequence at the time playback control of the photo player and the disc recorder is performed by using the remote control sender of the television receiver.

FIG. 21 illustrates an example of an operation sequence at the time playback control of the photo player 370B' and the disc recorder 210B is performed by using the remote control sender 277 of the television receiver 250B.

(a) When the user switches the input to the photo player 370B by using the remote control sender 277 of the television receiver 250B, (b) the television receiver 250B notifies a connected CEC-compliant device(s) of the fact that the input has been switched from the television receiver 250B to the photo player 370B' by performing SetStreamPath[0000]→→ [1100] using the CEC control protocol.

(c) On the basis of this notification, the AV amplifier 310 switches the input to the photo player 370B' side. (d) On the basis of this notification, the photo player 370B' with the logical address [1100] recognizes that the photo player 370B' itself has become Active, and (e) notifies the connected CEC-compliant device(s) of the fact that the device under control of CEC has been switched to the photo player 370B' by performing ActiveSource{4}→{F}. Accordingly, the television receiver 250B switches the remote control sending destination to the photo player 370B'.

(f) When the user presses a playback key on the remote control sender 277 of the television receiver 250B, (g) the television receiver 250B notifies the connected CEC-compliant device(s) of UserControlPressed:PB{4} using the CEC control protocol. (h) The photo player 370B with the logical address {4} detects this notification, plays an image in a flash memory, and sends the playback output to the television receiver 250B via the AV amplifier 310. Accordingly, the playback image of the flash memory is displayed on the television receiver 250B.

Next, (i) when the user switches the input to the disc recorder 210B by using the remote control sender 277 of the television receiver 250B, (j) the television receiver 250B notifies the connected CEC-compliant device(s) of the fact that the input has been switched from the photo player 370B' to the disc recorder 210B by performing SetStreamPath[1100]→[1200] using the CEC control protocol.

(k) On the basis of this notification, the AV amplifier 310 switches the input to the disc recorder 210B side. Also, (m) since CEC control on the physical address [1200] is performed by the AV amplifier 310 in place of the disc recorder 210B, on the basis of this notification, the AV amplifier 310 notifies the connected CEC-compliant device(s) of the fact that CEC control has been virtually switched to the disc recorder 210B by performing ActiveSource{1}→{F}. (p) Accordingly, the photo player 370B' recognizes that the photo player 370B' itself is no longer Active. Also, the television receiver 250B switches the remote control sending destination to the disc recorder 210B.

(q) When the user presses the playback key on the remote control sender 277 of the television receiver 250B, (r) the television receiver 250B notifies the connected CEC-compliant device(s) of UserControlPressed:PB{1} using the CEC control protocol. (s) Since control on the logical address {1} is performed by the AV amplifier 310 in place of the disc recorder 210B, the AV amplifier 310 detects this notification. The AV amplifier 310 converts a CEC playback command into an infrared remote control command and sends the infrared remote control command by using infrared radiation, thereby notifying the CEC-non-compliant disc recorder 210B.

(t) The disc recorder 210B detects this notification, plays an image recorded on a disc, and sends the playback output to the television receiver 250B via the AV amplifier 310. Accordingly, the playback image of the disc is displayed on the television receiver 250B.

Figure 22:
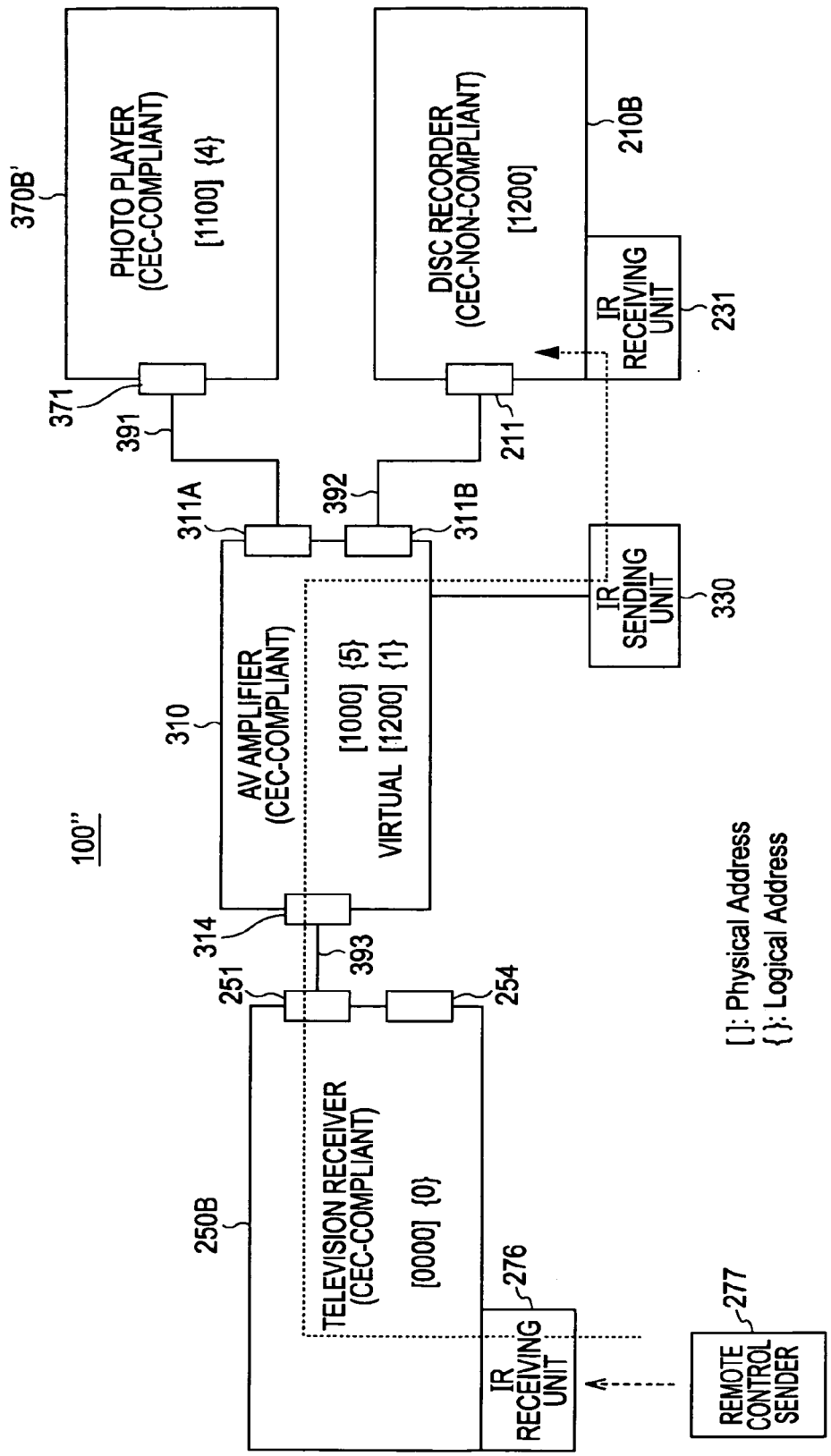
FIG. 22 is a diagram illustrating a channel of playback control of the disc recorder using the remote control sender of the television receiver.

FIG. 22 illustrates, by using a broken line, a channel of playback control of the above-described disc recorder 210, which uses the remote control sender 277 of the television receiver 250B.

As described above, in the AV system 100" illustrated in FIG. 17, when the user operates the disc recorder 210B, which is a CEC-non-compliant device, by using the remote control sender 277 of the television receiver 250B, a CEC control command addressed to the disc recorder 210B is generated from the television receiver 250B. In the AV amplifier 310, the CEC control command is converted into an infrared remote control command, and the infrared remote control command is sent to the disc recorder 210B. Therefore, in the AV system 100" illustrated in FIG. 17, the operation of the disc recorder 210B, which is a CEC-non-compliant device connected to the television receiver 250B via the AV amplifier 310, can be controlled by using the remote control sender 277 of the television receiver 250B.

Figure 23:
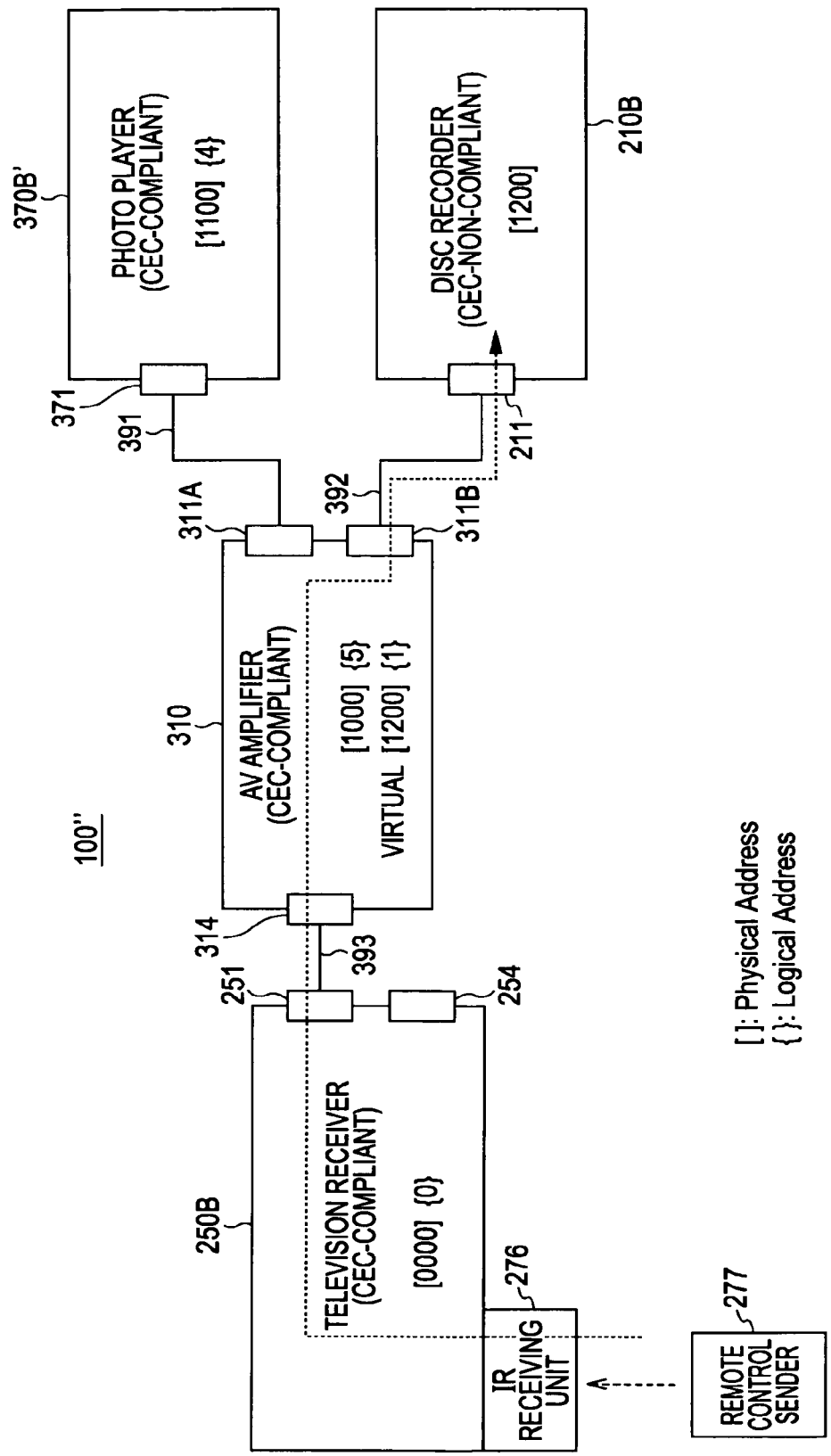
FIG. 23 is a diagram illustrating an example in which a control signal is sent from the AV amplifier to the disc recorder via a bidirectional communication channel constituted by predetermined lines of an HDMI cable.
Figure 24:
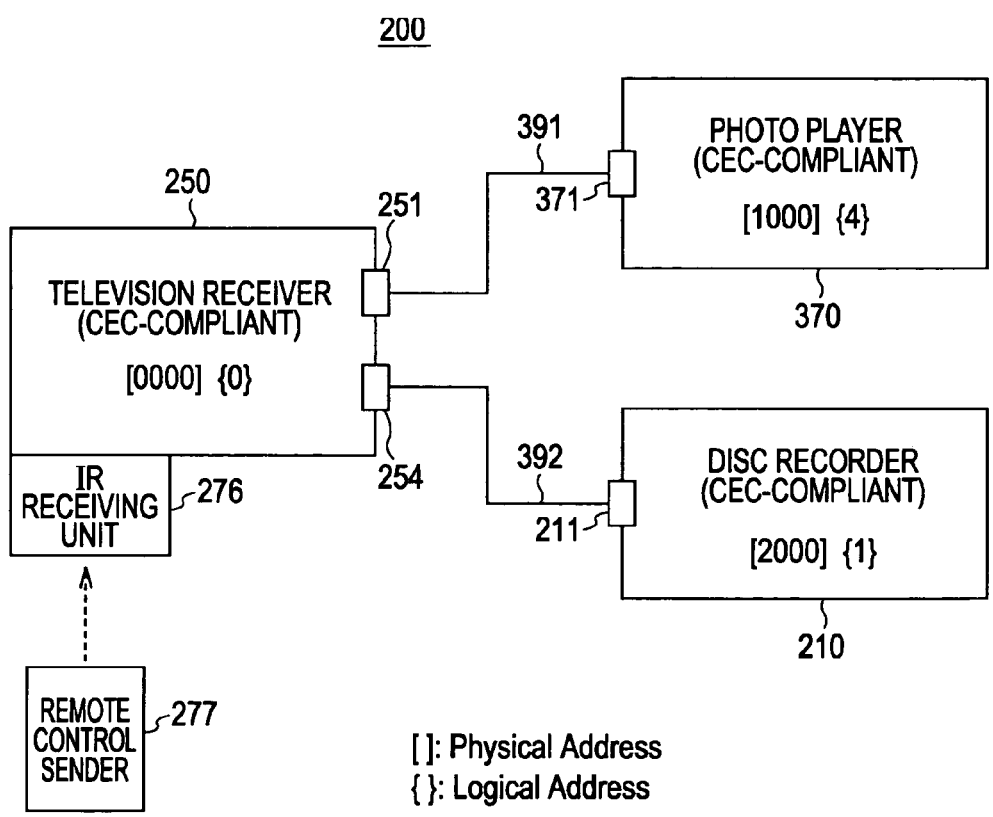
FIG. 24 is a block diagram illustrating a structure example of a known AV system.
Figure 25:
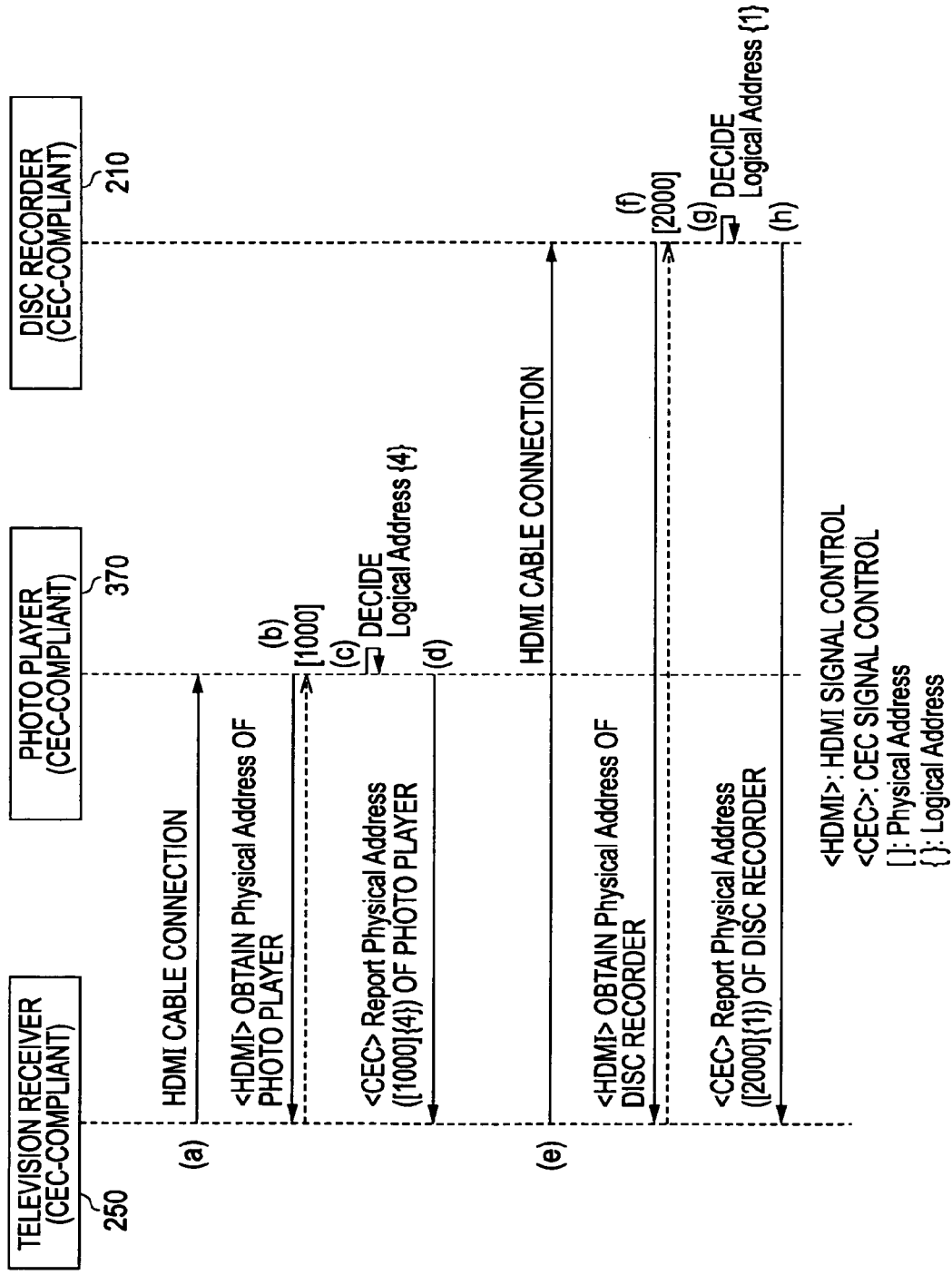
FIG. 25 is a diagram illustrating an example of an operation sequence at the time a photo player and a disc recorder are connected to a television receiver.
Figure 27:
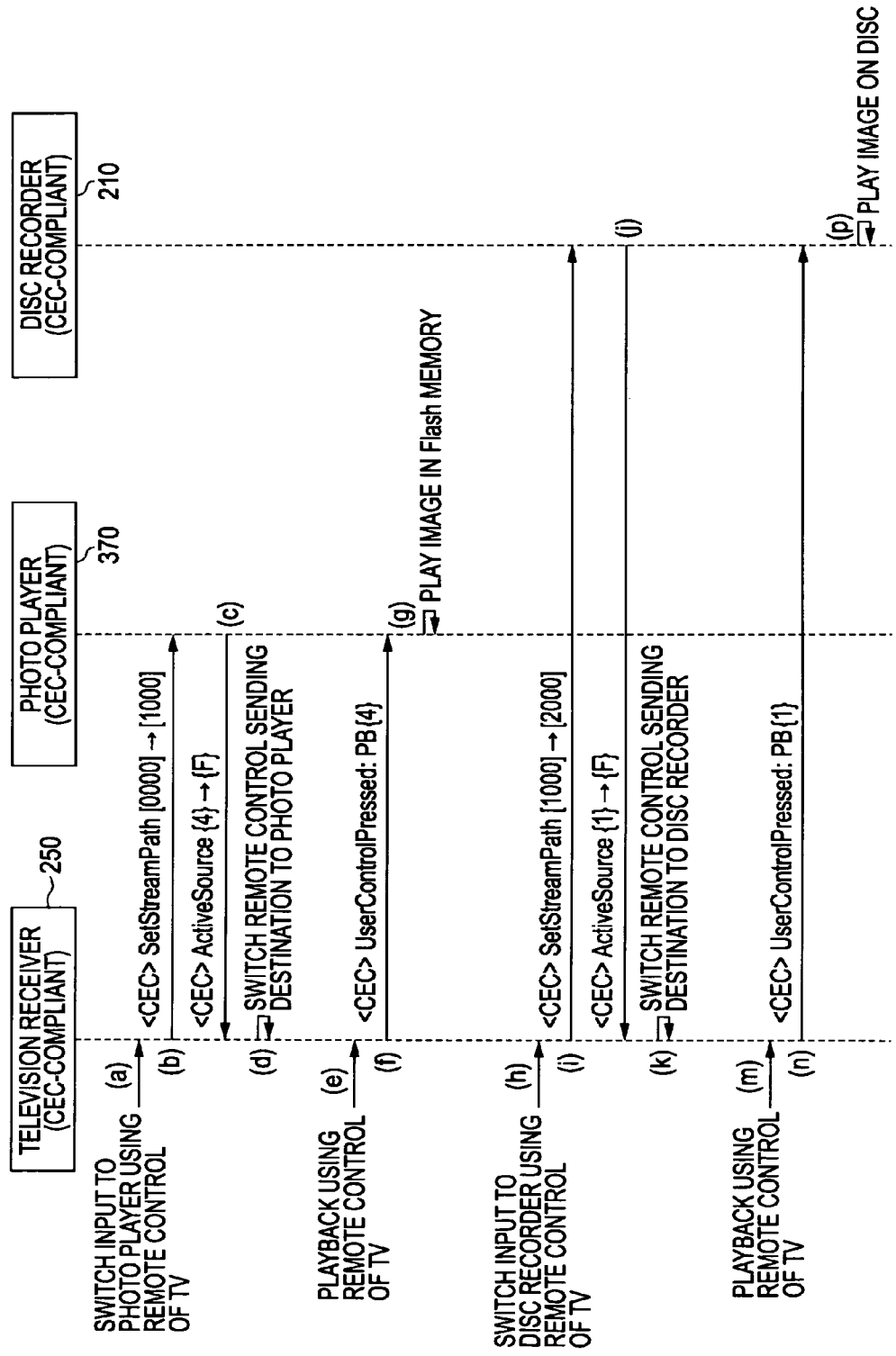
FIG. 27 is a diagram illustrating an example of an operation sequence at the time playback control of the photo player and the disc recorder is performed by using a remote control sender of the television receiver.
Figure 28:
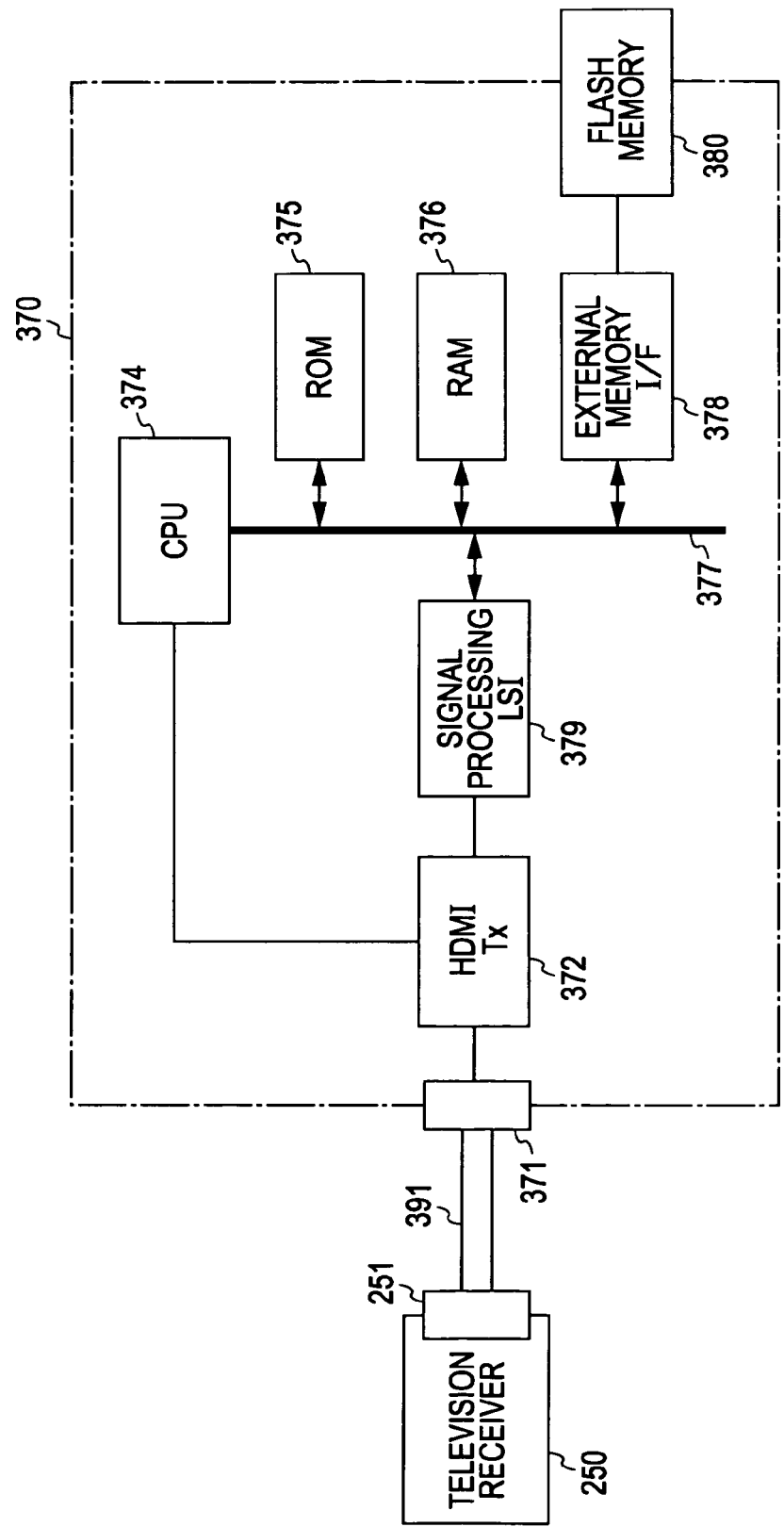
FIG. 28 is a block diagram illustrating a structure example of the photo player.
Figure 29:
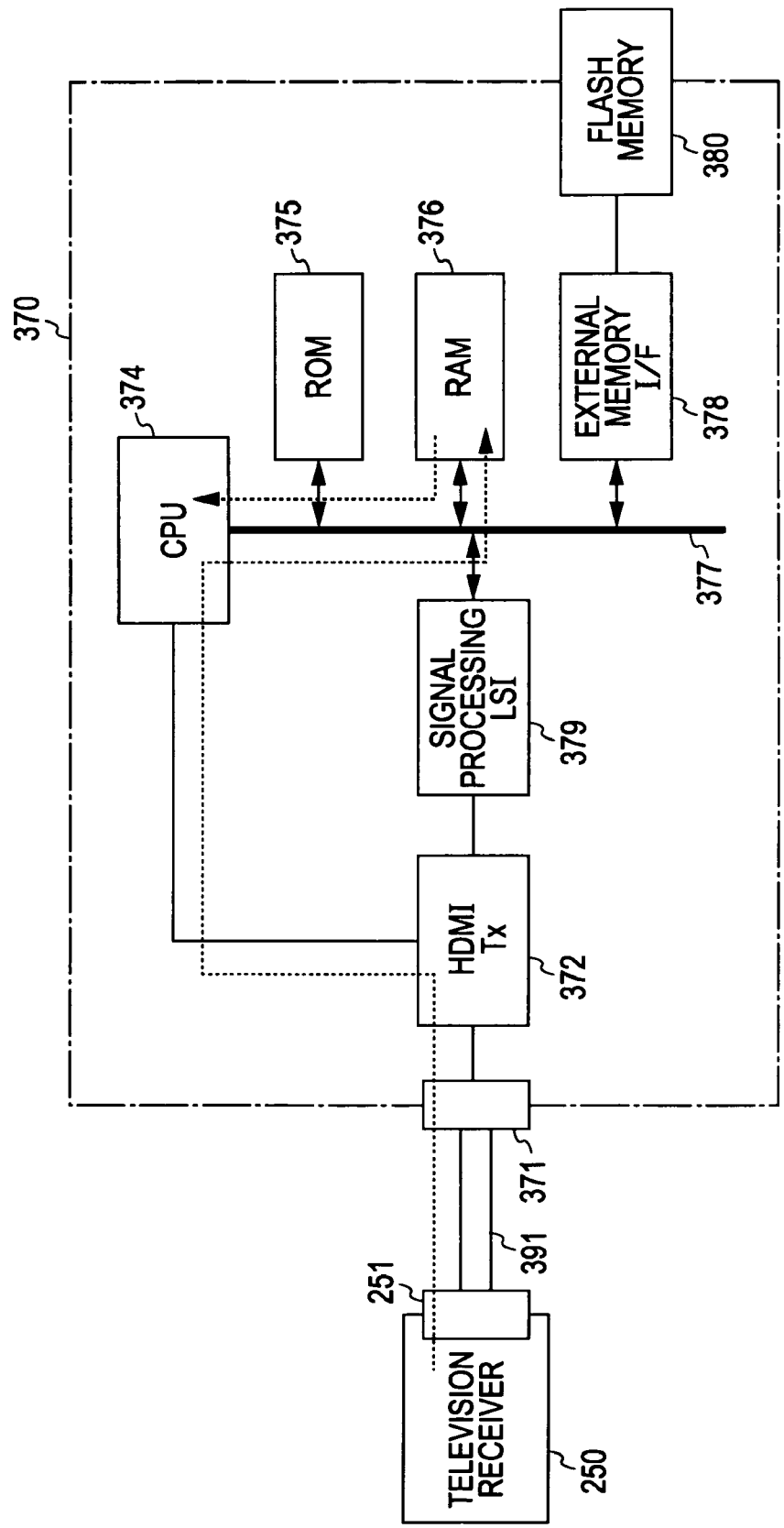
FIG. 29 is a diagram for describing the operation of the photo player at the time a CEC control command is received.
Figure 30:
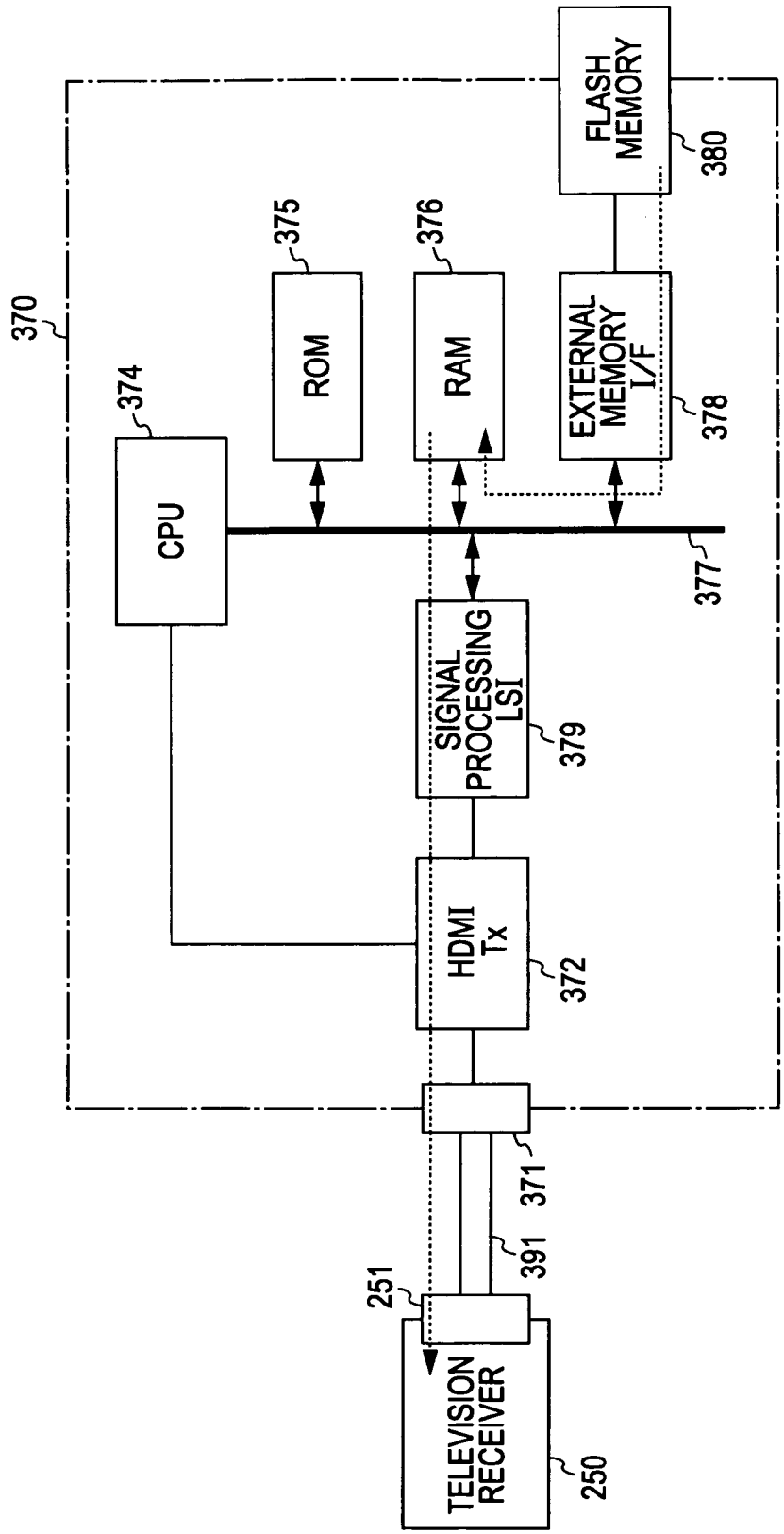
FIG. 30 is a diagram for describing the operation of the photo player at the time still image data is read.
Figure 31:
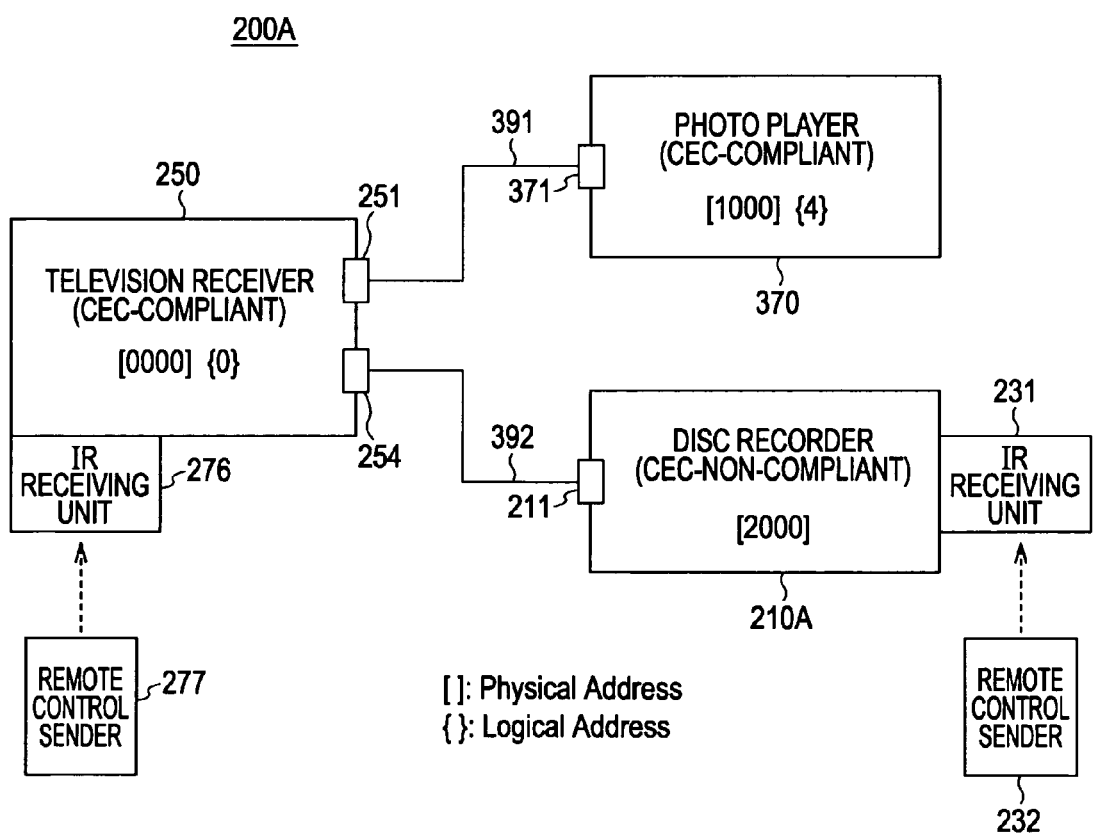
FIG. 31 is a block diagram illustrating another structure example of the known AV system.

Note that, in the embodiment illustrated in FIG. 17, the AV amplifier 310 which converts a CEC control command addressed to the disc recorder 210B into an infrared remote control command and sends the infrared remote control command to the disc recorder 210B is illustrated. However, the AV amplifier 310 may convert the CEC control command into a control signal in a predetermined format, and may send the control signal to the disc recorder 210B via a bidirectional communication channel constituted by the reserved line and the HPD line of the HDMI cable 392, as illustrated in FIG. 23. In this case, the infrared sending circuit 329 and the infrared sending unit 330 become unnecessary in the AV amplifier 310. Also in this case, the infrared receiving unit 231 becomes unnecessary in the disc recorder 210B.

Note that, in the above-described embodiments, it has been described that sink devices are the television receivers 250B and 250B' and source devices are the photo players 370B and 370B' and the disc recorder 210B. However, the scope of application of the present invention is not limited to these devices. Also, in the above-described embodiments, examples where the individual devices are connected by HDMI cables have been described. However, a transmission path that connects the individual devices is not limited to a wired line, and a wireless transmission path may be used.

INDUSTRIAL APPLICABILITY

The present invention is applicable to, for example, an AV system configured by connecting, besides a CEC-compliant device, a CEC-non-compliant device to a television receiver that is a CEC-compliant device.

The invention claimed is:
1. An electronic device comprising:
an information setting unit that sets information of a controlled device;
a control signal converting unit that converts, when a control signal in a first format is a control signal for the controlled device for which the information has been set by the information setting unit, the control signal into a control signal in a second format;
a control signal sending unit that sends the control signal in the second format, which is converted by the control signal converting unit, to the controlled device;
a control signal receiving unit that receives the control signal in the first format from an external device;
a video signal sending unit that sends a video signal as a differential signal to the external device by using a plurality of channels via a transmission path; and
a video signal receiving unit that receives, from the controlled device, a video signal as a differential signal by using a plurality of channels via a transmission path,
wherein the control signal receiving unit receives the control signal in the first format from the external device via a control data line constituting the transmission path, and
wherein the control signal sending unit sends the control signal in the second format to the controlled device via a bidirectional communication channel constituted by predetermined lines of the transmission path,
wherein the electronic device determines a logical address for the controlled device in response to a user input, and the logical address is determined on the basis of a table cross-referencing device types to logical addresses,
wherein after the electronic device determines a logical address for the controlled device, the electronic device notifies the external device that a physical address corresponding to the logical address is associated with a Consumer Electronics Control (CEC)-compliant device.

2. The electronic device according to claim 1, wherein the control signal sending unit sends the control signal in the second format as an infrared signal to the controlled device.

3. The electronic device according to claim 1, wherein the control signal in the first format is a CEC signal.

4. The electronic device according to claim 3, wherein the information setting unit sets at least a physical address and a device category of the controlled device.

5. The electronic device according to claim 1, wherein the predetermined lines are a reserved line and an HPD line constituting an HDMI cable.

6. An electronic device comprising:
an information setting unit that sets information of a controlled device;
a control signal converting unit that converts, when a control signal in a first format is a control signal for the controlled device for which the information has been set by the information setting unit, the control signal into a control signal in a second format;
a control signal sending unit that sends the control signal in the second format, which is converted by the control signal converting unit, to the controlled device;
a remote control receiving unit that receives a remote control signal; and
a control signal generating unit that generates the control signal in the first format based on the remote control signal received by the remote control receiving unit,
wherein the electronic device determines a logical address for the controlled device in response to a user input, and the logical address is determined on the basis of a table cross-referencing device types to logical addresses,
wherein after the electronic device determines a logical address for the controlled device, the electronic device notifies an external device that a physical address corresponding to the logical address is associated with a Consumer Electronics Control (CEC)-compliant device.

7. The electronic device according to claim 6, comprising:
a video signal receiving unit that receives, from the controlled device, a video signal as a differential signal by using a plurality of channels via a transmission path,
wherein the control signal sending unit sends the control signal in the second format to the controlled device via a bidirectional communication channel constituted by predetermined lines of the transmission path.

8. The electronic device according to claim 7,
wherein the predetermined lines are a reserved line and an HPD line constituting an HDMI cable.

9. An electronic device comprising:
an address information receiving unit that receives, from a first external device that handles a control signal in a first format, address information of a second external device that handles a control signal in a second format;
a remote control receiving unit that receives a remote control signal;
a control signal generating unit that generates the control signal in the first format for the second external device based on the remote control signal received by the remote control receiving unit and the address information of the second external device, which is received by the address information receiving unit; and
a control signal sending unit that sends the control signal in the first format, which is generated by the control signal generating unit, to the first external device,
wherein the first external device determines a logical address for the second external device in response to a user input, and the logical address is determined on the basis of a table cross-referencing device types to logical addresses,
wherein after the first external device determines a logical address for the second external device, the first external device notifies the electronic device that a physical address corresponding to the logical address is associated with a Consumer Electronics Control (CEC)-compliant device.

10. The electronic device according to claim 9, comprising:
a video signal receiving unit that receives, from the first external device, a video signal as a differential signal by using a plurality of channels via a transmission path,
wherein the control signal sending unit sends the control signal in the first format to the first external device via a control data line constituting the transmission path.

11. The electronic device according to claim 10,
wherein the control signal in the first format is a CEC signal, and
wherein the address information of the second external device, which is received by the address information receiving unit, is a virtual logical address of the second external device, which is set in the first external device.

* * * * *